United States Patent
Kenthapadi et al.

(10) Patent No.: US 10,037,437 B1
(45) Date of Patent: *Jul. 31, 2018

(54) IDENTIFYING COHORTS WITH ANOMALOUS CONFIDENTIAL DATA SUBMISSIONS USING MATRIX FACTORIZATION AND COMPLETION TECHNIQUES

(71) Applicant: Microsoft Technology Licensing, LLC, Redmond, WA (US)

(72) Inventors: Krishnaram Kenthapadi, Sunnyvale, CA (US); Stuart MacDonald Ambler, Longmont, CO (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/618,583

(22) Filed: Jun. 9, 2017

(51) Int. Cl.
    *G06F 21/60*     (2013.01)
    *G06F 21/62*     (2013.01)
    *H04L 9/14*     (2006.01)
    *G06N 99/00*     (2010.01)
    *G06F 17/18*     (2006.01)
    *G06Q 50/00*     (2012.01)

(52) U.S. Cl.
    CPC ......... *G06F 21/6254* (2013.01); *G06F 17/18* (2013.01); *G06F 21/6227* (2013.01); *G06N 99/005* (2013.01); *H04L 9/14* (2013.01); *G06Q 50/01* (2013.01)

(58) Field of Classification Search
    CPC ..... G06F 21/604; G06F 21/6218; G06F 17/00
    See application file for complete search history.

(56) References Cited

U.S. PATENT DOCUMENTS

| | | | | |
|---|---|---|---|---|
| 7,668,843 | B2* | 2/2010 | Ertoz | G06F 21/552 |
| | | | | 706/20 |
| 8,583,649 | B2* | 11/2013 | Ailon | G06F 17/3071 |
| | | | | 707/738 |
| 9,336,302 | B1* | 5/2016 | Swamy | G06F 17/3071 |
| 2003/0224344 | A1* | 12/2003 | Shamir | G06F 19/24 |
| | | | | 435/4 |
| 2011/0231350 | A1* | 9/2011 | Momma | G06F 17/30943 |
| | | | | 706/12 |
| 2013/0145473 | A1* | 6/2013 | Cormode | G06F 21/10 |
| | | | | 726/26 |
| 2014/0114609 | A1* | 4/2014 | Maurer | H03H 21/0016 |
| | | | | 702/179 |

* cited by examiner

*Primary Examiner* — Wasika Nipa
(74) *Attorney, Agent, or Firm* — Schwegman Lundberg & Woessner, P.A.

(57) ABSTRACT

In an example, for each value of a plurality of values of a first attribute of members of a social networking service who have submitted confidential data, an allowed range for normalized confidential data values submitted by members having the value for the first attribute, across all values of a second attribute, is calculated, and then shifted based on an inferred median confidential data value relative to a median of confidential data values. Then, anomalous confidential data values can be detected using this information.

20 Claims, 16 Drawing Sheets

US 10,037,437 B1

IDENTIFYING COHORTS WITH ANOMALOUS CONFIDENTIAL DATA SUBMISSIONS USING MATRIX FACTORIZATION AND COMPLETION TECHNIQUES

TECHNICAL FIELD

The present disclosure generally relates to computer technology for solving technical challenges in collection and maintenance of confidential data in a computer system. More specifically, the present disclosure relates to using computerized matrix factorization and completion techniques to identify cohorts with anomalous confidential data submissions.

BACKGROUND

In various types of computer systems, there may be a need to collect, maintain, and utilize confidential data. In some instances, users may be reluctant to share this confidential information over privacy concerns. These concerns extend not only to pure security concerns, such as concerns over whether third parties such as hackers may gain access to the confidential data, but also to how the computer system itself may utilize the confidential data. With certain types of data, users providing the data may be somewhat comfortable with uses of the data that maintain anonymity, such as the confidential data merely being used to provide broad statistical analysis to other users.

One example of such confidential data is salary/compensation information. It may be desirable for a service such as a social networking service to request its members to provide information about their salary or other work-related compensation in order to provide members with insights as to various me\trics regarding salary/compensation, such as an average salary for a particular job type in a particular city. There are technical challenges encountered, however, in ensuring that such confidential information remains confidential and is only used for specific purposes, and it can be difficult to convince members to provide such confidential information due to their concerns that these technical challenges may not be met.

Additionally, certain types of combinations of cohorts may have sparse confidential data submitted. For example, in the case of salary information, certain combinations of locations and job titles may not have enough actual submitted confidential data points in order to provide meaningful statistical insights.

BRIEF DESCRIPTION OF THE DRAWINGS

Some embodiments of the technology are illustrated, by way of example and not limitation, in the figures of the accompanying drawings.

DETAILED DESCRIPTION

The present disclosure describes, among other things, methods, systems, and computer program products. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, an architecture is provided that gathers confidential information from users, tracks the submission of the confidential information, and maintains and utilizes the confidential information in a secure manner while ensuring that the confidential information is accurate and reliable.

Figure 1:
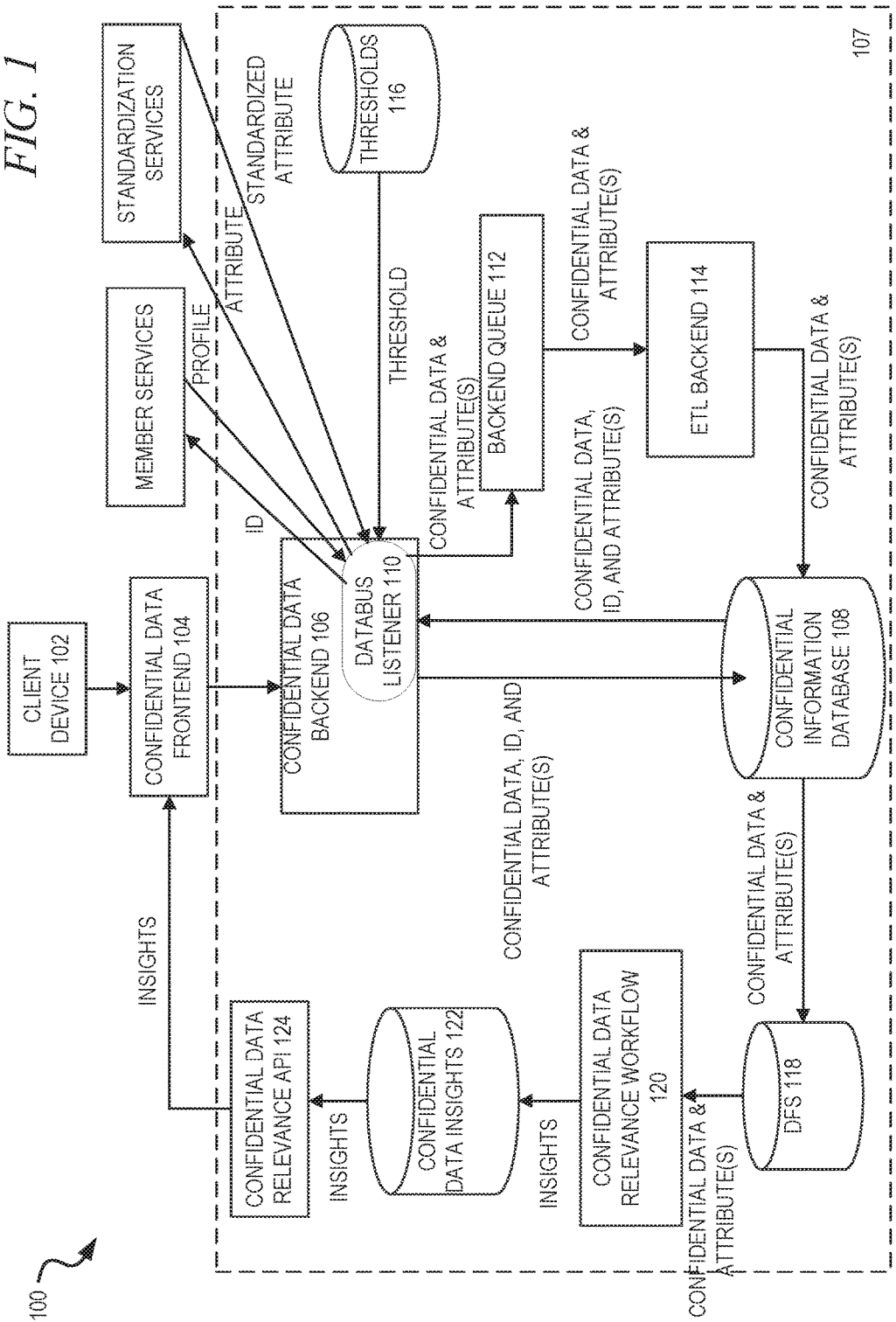
FIG. 1 is a block diagram illustrating a confidential data collection, tracking, and usage system, in accordance with an example embodiment.

FIG. 1 is a block diagram illustrating a confidential data collection, tracking, and usage system 100, in accordance with an example embodiment. A client device 102 may utilize a confidential data frontend 104 to submit confidential information to a confidential data backend 106. In some example embodiments, the confidential data backend 106 is located on a server-side or cloud platform 107 while the confidential data frontend 104 is directly connected to or embedded in the client device 102. However, in some example embodiments, the confidential data frontend 104 is also located on the server-side or cloud platform 107.

There may be various different potential implementations of the confidential data frontend 104, depending upon the type and configuration of the client device 102. In an example embodiment, the confidential data frontend 104 may be a web page that is served to a web browser operating on the client device 102. The web page may include various scripts, such as JavaScript code, in addition to Hypertext Markup Language (HTML) and Cascading Style Sheets (CSS) code designed to perform various tasks that will be described in more detail below. The web page may be served in response to the user selecting a link in a previous communication or web page. For example, the link may be displayed in an email communication to the user, or as part of a feed section of the user's social networking service member page. This allows the entity operating the confidential data collection, tracking, and usage system 100 to selectively target users to request that they submit confidential information. For example, the entity may determine that there is a need to obtain more salary information for users from Kansas and then may send out communications to, or cause the social networking service to alter feeds of, users in a manner that allows the users to select the link to launch the confidential data frontend 104.

In another example embodiment, the confidential data frontend 104 may be built into an application installed on the client device 102, such as a standalone application running on a smartphone. Again this confidential data frontend 104 is designed to perform various tasks that will be described in more detail below.

One task that the confidential data frontend 104 may be designed to perform is the gathering of confidential data from a user of the client device 102. Another task that the confidential data frontend 104 may be designed to perform is to display insights from confidential data contributed by other users. In order to incentivize users to provide certain types of confidential data, in an example embodiment, insights from the confidential data contributed by other users are provided in response to the user contributing his or her own confidential data. As will be described in more detail, a mechanism to ensure that the contribution of confidential data is tracked is provided.

Once the confidential data is received from the user, the confidential data frontend 104 may transmit the confidential data along with an identification of the user (such as a member identification reflecting the user's account with a social networking service) to the confidential data backend 106. In an example embodiment, this may be performed via, for example, a REST Application Program Interface (API).

The confidential data, along with the identification of the user, may be stored in a submission table by the confidential data backend 106 in a confidential information database 108. In some example embodiments, this submission table may be encrypted in order to ensure security of the information in the submission table. Furthermore, in some example embodiments, the confidential data stored in the submission table may be encrypted using a different key than the identifying information in the submission table. This encryption will be described in more detail below.

In another example embodiment, a random transaction number is generated for each confidential data submission. This random transaction number is stored with the identifying information in one table, and then stored with the confidential data in another table, with each table encrypted separately using a different key. In either this example embodiment or the previous example embodiment, encrypting the identifying information separately from the confidential data (either in one table or in separate tables) provides added security against the possibility that a malicious user could gain access to one or the other. In other words, even if a malicious user gained access to the identifying information by, for example, hacking the encryption used to encrypt the identifying information, that would not allow the malicious user to gain access to the confidential data corresponding to the identifying information, and vice versa. In an example embodiment, the encryption mechanism used is one that is non-deterministic, such that the same information encrypted twice would produce different results in each encryption. In another example embodiment, the transaction number itself is also encrypted, thereby preventing even the act of joining separate tables containing the identifying information and the confidential data.

In an example embodiment, a submission table may also be able to track when submissions were made by users. As such, the submission table may include additional columns, such as, for example, a submission identification, an identification of the user who made the submission, an encryption key for the submission, and timestamp information about when the submission was made. The submission table may then be utilized by the confidential data backend 106 to determine, for example, when to share insights from submissions from other users to a particular user. If, for example, the user has previously submitted confidential data and has done so recently (e.g., within the last year), then the confidential data backend 106 may indicate to the confidential data frontend 104 that it should share insights from confidential data from other users with this particular user.

There may be other methods than those described above for determining eligibility of a user for receiving insights from submissions from other users. For example, a predicate expressed in terms of one or more attributes may need to be satisfied in order to receive the insights, such as particular demographic or profile-based attributes. These attributes can include any such attribute, from location to title, to level of skill, to social networking service activities or status (e.g., about to transition from being an active member to an inactive member), to transactional attributes (e.g., purchased a premium subscription).

Additionally, any combination of the above factors can be used to determine whether the user is eligible for receiving insights from submissions from other users.

Furthermore, the submission table may also include one or more attributes of the user that made the submission. These attributes may be attributes that can be useful in determining a slice to which the user belongs. Slices will be described in more detail below, but generally involve a segment of users sharing common attributes, such as titles, locations, educational levels, and the like. It should be noted that it is not necessary for these attributes to be stored in the submission table. Since an identification of the user is available in the submission table, it may be possible to retrieve the attributes for the user on an as-needed basis, such as by querying a social networking service with the user identification when needed.

A databus listener 110 detects when new confidential data is added to the confidential information database 108 and triggers a workflow to handle the new confidential data. First, the databus listener 110 queries a thresholds data store 116 to determine if one or more thresholds for anonymization have been met. Specifically, until a certain number of data points for confidential data have been met, the confidential data collection, tracking, and usage system 100 will not act upon any particular confidential data data point. As will be described in more detail later, these thresholds may be created on a per-slice basis. Each slice may define a segment of users about which insights may be gathered based on data points from confidential data submitted by users in the slice. For example, one slice may be users with the title "software engineer" located in the "San Francisco Bay Area." If, for example, the confidential data is compensation information, then it may be determined that in order to gain useful insights into the compensation information for a particular title in a particular region, at least ten data points (e.g., compensation information often different users) are needed. In this case, the threshold for "software engineer" located in "San Francisco Bay Area" may be set at ten. The databus listener 110, therefore, is designed to retrieve the confidential data added to the confidential information database 108, retrieve the threshold for the slice corresponding to attributes of the user (as stored, for example, in the submission table in the confidential information database 108 or retrieved at runtime from a social networking service), determine if the new data point(s) cause the threshold for the corresponding slice to be exceeded, and, if so, or if the threshold had already been exceeded, insert the data in a backend queue 112 for extract, transform, and load (ETL) functions.

In an example embodiment, the thresholds data store 116 contains not just the thresholds themselves but also a running count of how many data points have been received for each slice. In other words, the thresholds data store 116 indicates how close the slice is to having enough data points with which to provide insights. The databus listener 110 may reference these counts when making its determination that a newly submitted data point causes a threshold to be exceeded. Running counts of data points received for each slice are updated in the thresholds data store 116 by the confidential data backend 106.

Since the databus listener 110 only transfers data points for a particular slice to the backend queue 112 once the threshold for that slice has been exceeded, the confidential data data points corresponding to that slice may need to be retrieved from the confidential information database 108 once the threshold is determined to be exceeded. For example, if, as above, the threshold for a particular slice is ten data points, the first nine data points received for that slice may simply be left in the confidential information database 108 and not sent to the backend queue 112. Then, when the tenth data point for the slice is stored in the confidential information database 108, the databus listener 110 may determine that the threshold has been exceeded and retrieve all ten data points for the slice from the confidential information database 108 and send them to the backend queue 112 for processing.

It should be noted that the information obtained by the databus listener 110 from the confidential information database 108 and placed in the backend queue 112 is anonymized. In an example embodiment, no identification of the users who submitted the confidential data is provided to the backend queue 112. Indeed, in some example embodiments, the information provided to the backend queue 112 may simply be the confidential data itself and any information needed in order to properly group the confidential data in one or more slices. For example, if slices are designed to group user confidential data based only on user title, location, and years of experience, other attributes for the user that might have been stored in the confidential information database 108, such as schools attended, may not be transferred to the backend queue 112 when the confidential data tied to those attributes is transferred to the backend queue 112. This further helps to anonymize the data, as it makes it more difficult for people to be able to deduce the identity of a user based on his or her attributes.

It should also be noted that any one piece of confidential data may correspond to multiple different slices, and thus the databus listener 110 may, in some example embodiments, provide the same confidential data to the backend queue 112 multiple times. This can occur at different times as well, because each of the slices may have its own threshold that may be transgressed at different times based on different counts. Thus, for example, compensation data for a user in the "San Francisco Bay Area" with a job title of "software developer" and a school attended as "Stanford University" may be appropriately assigned to one slice of software developers in the San Francisco Bay Area, a slice of Stanford University alums, and a slice of software developers in the United States. All slices may have their own thresholds and counts from confidential data from other users, who may or may not have complete overlap with these three slices.

An ETL backend 114 acts to extract, transform, and load the confidential data to anonymize and group it and place it back in the confidential information database 108 in a different location from that where it was stored in non-anonymized form. It should be noted that in some example embodiments, the anonymization described above with respect to the databus listener 110 may actually be performed by the ETL backend 114. For example, the databus listener 110 may send non-anonymized confidential data along with all attributes to the backend queue 112, and it may be the ETL backend 114 that reviews this data and discards certain elements of it to anonymize it.

In an example embodiment, the confidential information is stored in encrypted format in the confidential information database 108 when the databus listener 110 sends it to the backend queue 112. As such, one function of the ETL backend 114 is to decrypt the confidential information. Encryption and decryption of the confidential data will be discussed in more detail below.

The ETL backend 114 writes the anonymized confidential data and slice information into an ETL table corresponding to the slice in the confidential information database 108. As described earlier, this ETL table may be stored in a different location than that in which the confidential data was stored initially, such as the submission table described earlier.

At a later time, and perhaps using a batch or other periodic process, the information from the ETL table may be loaded in a distributed file system (DFS) 118. A confidential data relevance workflow 120 may then extract relevant information from the DFS 118 and provide one or more insights into the relevant information in a confidential data insights data store 122. A confidential data relevance API 124 may then be utilized to provide insights from the confidential data insights data store 122 to the confidential data frontend 104, which can then display them to a user. As described earlier, these insights may be provided only on a "give-to-get" basis, namely that only users who provide confidential information (and/or have provided it recently) can view insights.

Figure 2A:
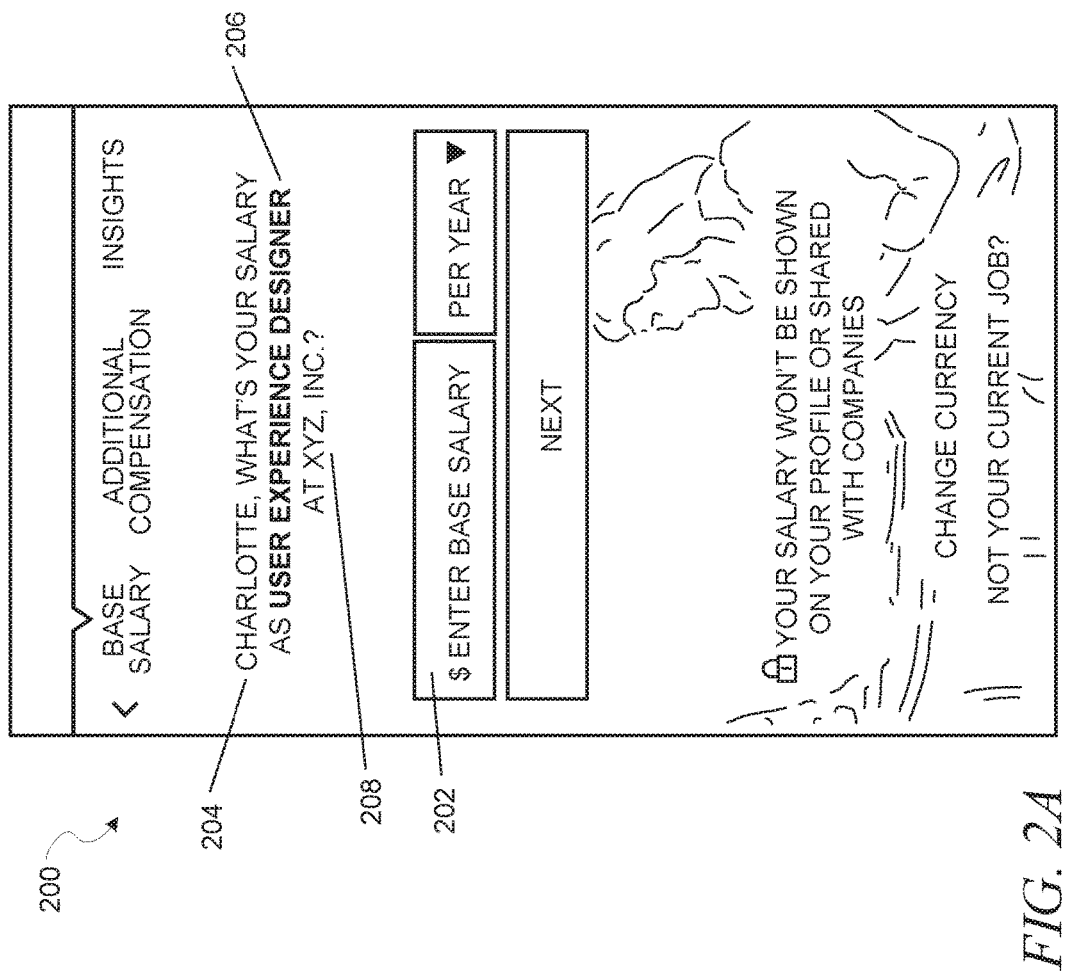
FIGS. 2A-2C are screen captures illustrating an example of a user interface provided by a confidential data frontend, in accordance with an example embodiment.
Figure 2B:
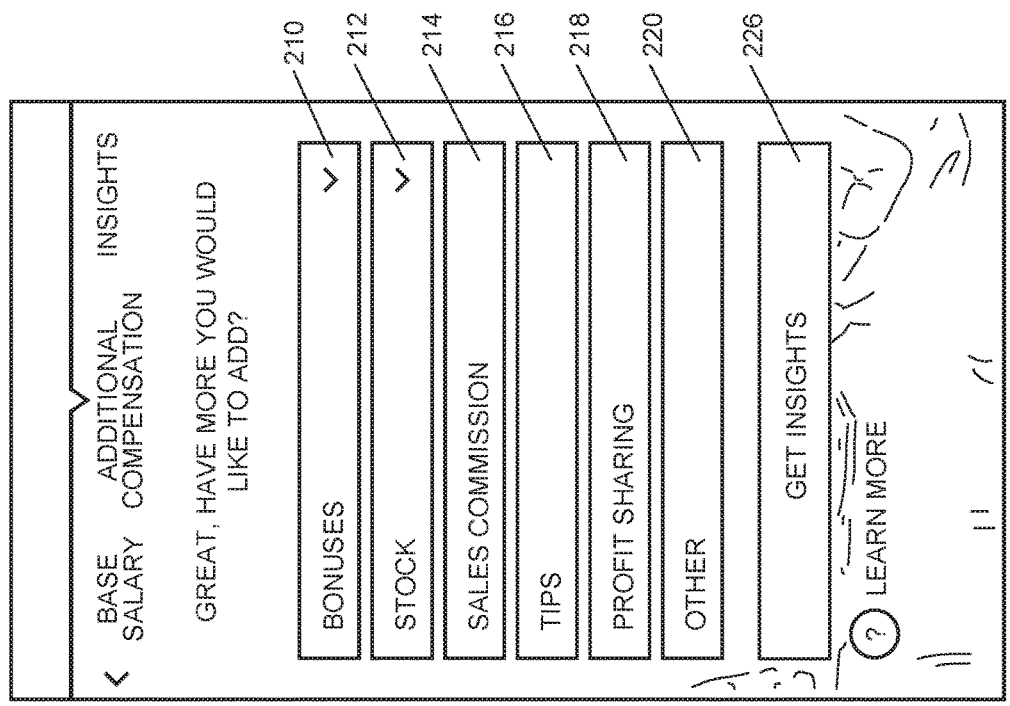
Figure 2C:
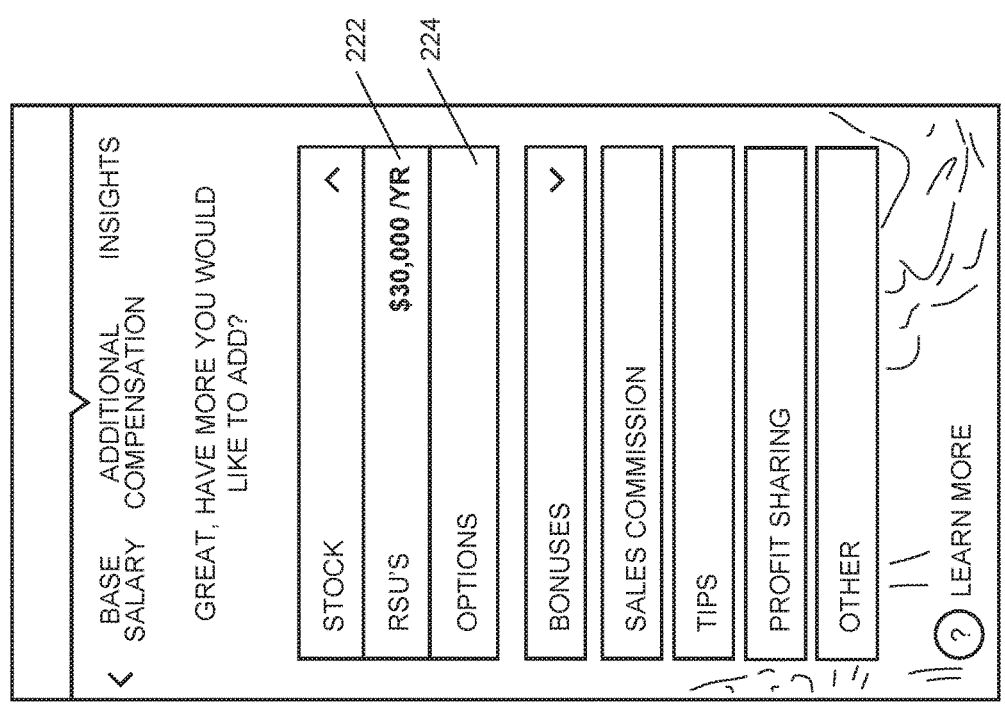

Turning now to more detail about the submission process, FIGS. 2A-2C are screen captures illustrating an example of a user interface 200 provided by the confidential data frontend 104, in accordance with an example embodiment. Referring first to FIG. 2A, the user interface 200 here is depicted as a screen of a standalone application operating on a mobile device, such as a smartphone. In FIG. 2A, the user is prompted to enter a base salary in a text box 202, with a drop-down menu providing options for different time periods on which to measure the base salary (e.g., per year, per month, per hour, etc.). Additionally, the user may be identified by name at 204, the user's title may be identified at 206, and the user's current employer may be identified at 208. This information may be pre-populated into the user interface 200, such as by retrieving this information from a member profile for the user in a social networking service.

This eliminates the need for the user to enter this information manually, which can have the effect of dissuading some users from providing the confidential information or completing the submission process, especially on a mobile device where typing or otherwise entering information may be cumbersome.

Turning to FIG. 2B, here the user interface 200 displays a number of other possible compensation types 210-220 from which the user can select. Selecting one of these other possible compensation types 210-220 causes the user interface 200 to provide an additional screen where the user can submit confidential data regarding the selected compensation type 210-220. Here, for example, the user has selected "Stock" 212. Referring now to FIG. 2C, the user interface 200 then switches to this screen, which allows the user to provide various specific details about stock compensation, such as restricted stock unit (RSU) compensation 222 and options 224. The user interface 200 at this stage may also display the other compensation types 210-220 that the user can make additional submissions for.

Referring back to FIG. 2B, when the user has completed entering all the confidential data, such as all the different compensation types appropriate for his or her current job, a "Get insights" button 226 may be selected, which launches a process by which the confidential data backend 106 determines whether the user is eligible to receive insights from confidential data from other users and, if so, indicates to the confidential data backend 106 that the insights should be provided. Additionally, selection of the "Get insights" button 226 represents an indication that the submission of the confidential data by this user has been completed, causing the confidential data backend 106 to store the confidential data in the confidential information database 108 as described below, which then may trigger the databus listener 110 to extract the confidential information and cause the ETL backend 114 to anonymize the confidential data and place it in the appropriate ETL tables corresponding to the appropriate slices in which the confidential data belongs. This permits the submitted confidential data to be available for future insights.

Figure 3:
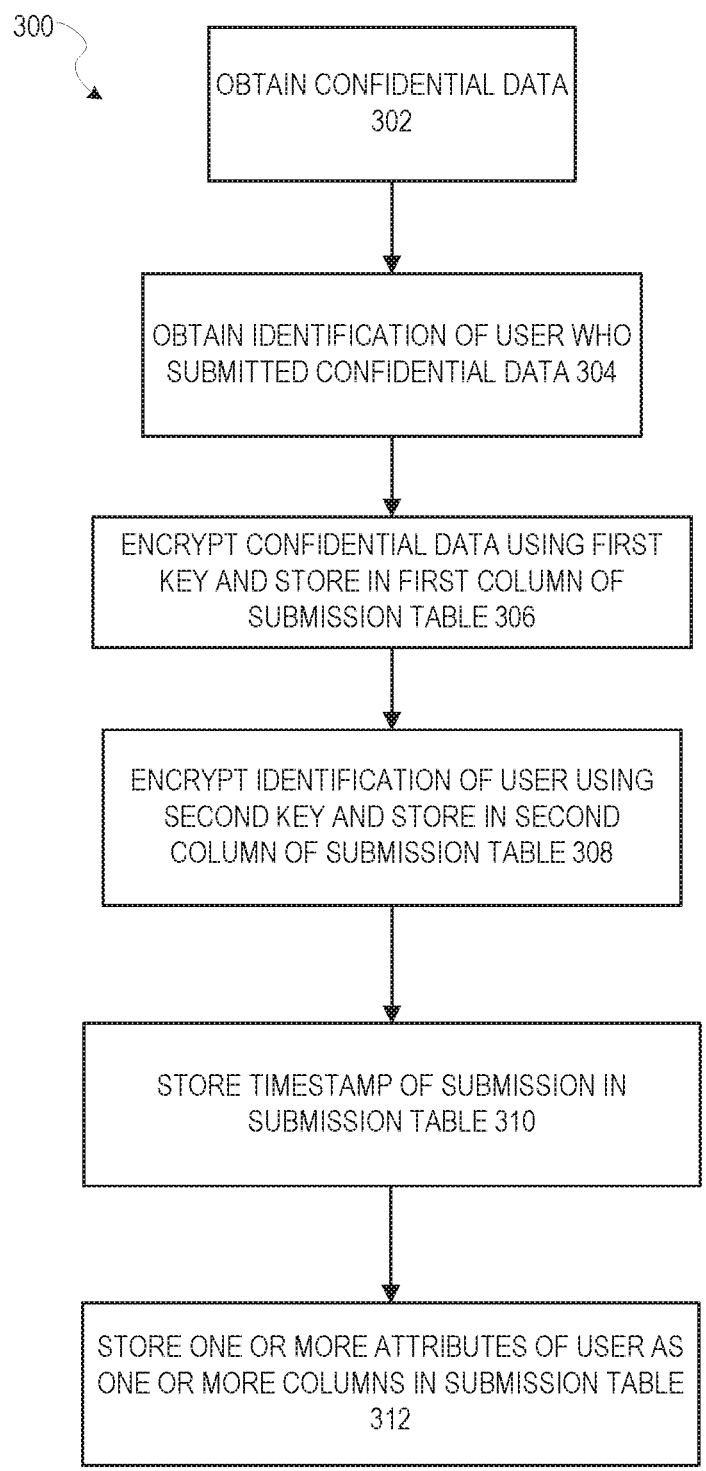
FIG. 3 is a flow diagram illustrating a method for confidential data collection and storage, in accordance with an example embodiment.

FIG. 3 is a flow diagram illustrating a method 300 for confidential data collection and storage, in accordance with an example embodiment. In an example embodiment, the method 300 may be performed by the confidential data backend 106 of FIG. 1. At operation 302, confidential data is obtained. At operation 304, an identification of the user who submitted the confidential data is obtained. It should be noted that while operations 302 and 304 are listed separately, in some example embodiments they may be performed in the same operation. For example, in an example embodiment, the confidential data frontend 104 may, upon receiving an indication from a user that input of confidential data in the confidential data frontend 104 by the user has been completed, forward the inputted confidential data and an identification of the user to the confidential data backend 106. In other example embodiments, however, the operations 302 and 304 may be performed separately. For example, in an example embodiment, the identification of the user may not be obtained directly from the confidential data frontend 104, but rather some other type of identifying information may be obtained directly from the confidential data frontend 104, and this other type of identifying information may be used to query a social networking service or other third-party service for the identification information for the user. Regardless, after operations 302 and 304 have been performed, the confidential data backend 106 has at its disposal some confidential data and identification information for the user who entered the confidential data.

It should be noted that the confidential data may be a single piece of information, or may be multiple, related pieces of information. For example, the confidential data may simply include a total compensation value and nothing more, or may include a complete breakdown of different types of compensation (e.g., base salary, bonus, stock, etc.).

Users are understandably concerned about the security of the confidential information, and specifically about a malicious user being able to correlate the confidential information and the identification of the user (i.e., not just learning the confidential information but tying the confidential information specifically to the user). As such, at operation 306, the confidential data is encrypted using a first key and stored in a first column of a submission table in a confidential information database. Then, at operation 308, the identification of the user who submitted the confidential data is separately encrypted using a second key and stored in a second column of the submission table in the confidential information database.

Additionally, a number of optional pieces of information may, in some example embodiments, be stored in the submission table at this point. At operation 310, a timestamp of the submission of the confidential data may be stored in a column in the submission table. This timestamp may be used in, for example, a determination of whether the user is eligible to receive insights from confidential data submitted by other users. At operation 312, one or more attributes of the user may be stored as one or more columns in the submission table. These attributes may be used, for example, in determining to which slice(s) the confidential data may apply, as will be described in more detail below.

Figure 4:
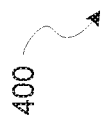
FIG. 4 is a diagram illustrating an example of a submission table, in accordance with an example embodiment.

FIG. 4 is a diagram illustrating an example of a submission table 400, in accordance with an example embodiment. Each row in the submission table 400 corresponds to a different submission. Here, the submission table 400 includes five columns. In a first column 402, confidential data encrypted by a first key is stored. In a second column 404, identification of the user who submitted the corresponding confidential data, encrypted by a second key, is stored. In a third column 406, a timestamp for the submission is stored. In a fourth column 408, a first attribute of the user, here location, is stored. In a fifth column 410, a second attribute of the user, here title, is stored. Of course, there may be additional columns to store additional attributes or other pieces of information related to the submission.

Notably, FIG. 4 depicts an example embodiment where only the first and second columns 402, 404 are encrypted, using different encryption keys. In some example embodiments, the additional columns 406-410 may also be encrypted, either individually or together. In some example embodiments, one or more of these additional columns 406-410 may be encrypted using the same key as the first or second column 402, 404. Furthermore, in some example embodiments, the submission table 400 may be additionally encrypted as a whole, using a third encryption key different from the keys used to encrypt the first and second columns 402, 404.

It should be noted that while FIGS. 3 and 4 describe the confidential data as being stored in a single column in a submission table, in some example embodiments, this column is actually multiple columns, or multiple sub-columns, with each corresponding to a subset of the confidential data. For example, if the confidential data is compensation information, the confidential data may actually comprise multiple different pieces of compensation information, such as base salary, bonus, stock, tips, and the like. Each of these pieces of compensation information may, in some example embodiments, have its own column in the submission table. Nevertheless, the processes described herein with regard to the "column" in which the confidential data is stored apply equally to the embodiments where multiple columns are used (e.g., the individual pieces of compensation information are still encrypted separately from the user identification information).

Figure 5:
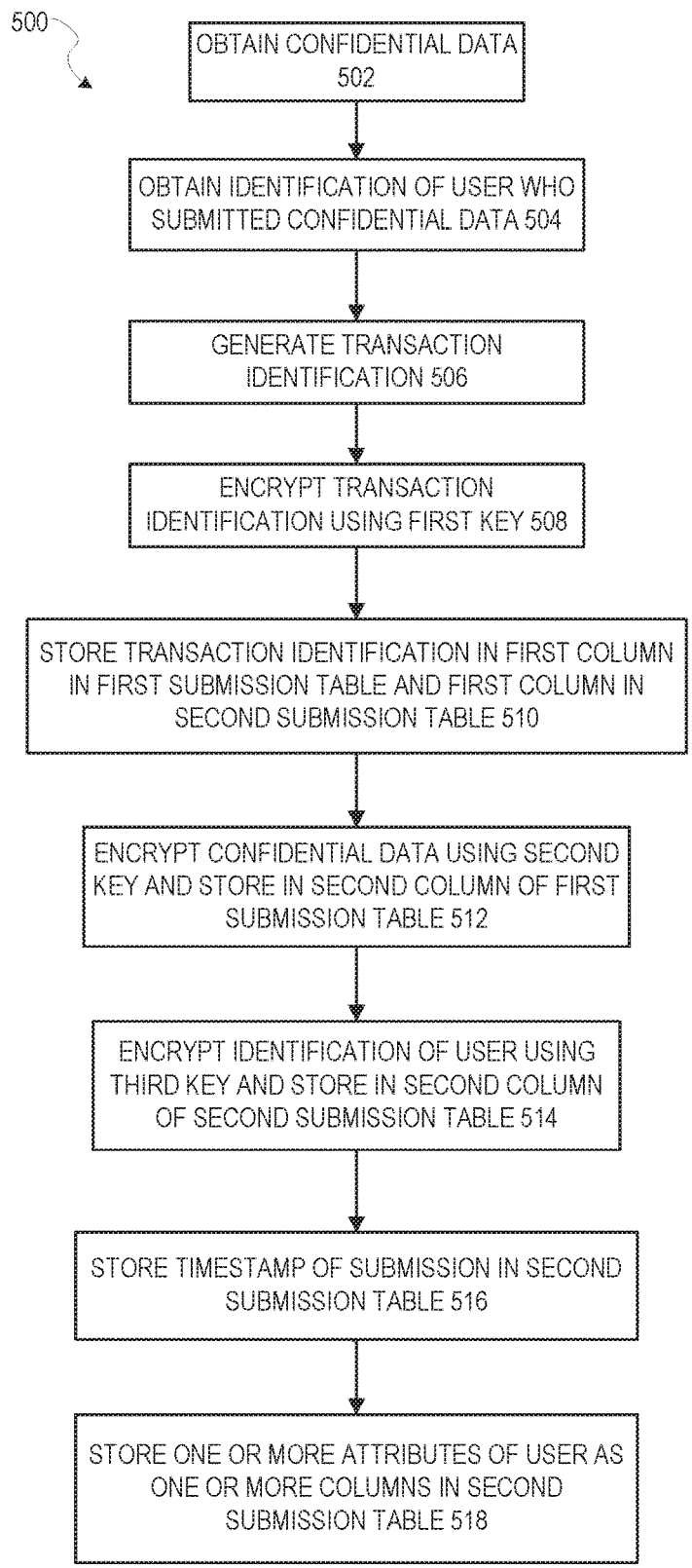
FIG. 5 is a flow diagram illustrating a method for confidential data collection and storage, in accordance with an example embodiment.

FIG. 5 is a flow diagram illustrating a method 500 for confidential data collection and storage, in accordance with an example embodiment. In contrast with FIG. 3, FIG. 5 represents an example embodiment where the confidential data and the identification of the user who submitted the confidential data are stored in separate tables in order to provide additional security. At operation 502, confidential data is obtained. At operation 504, an identification of the user who submitted the confidential data is obtained. As in FIG. 3, while operations 502 and 504 are listed separately, in some example embodiments they may be performed in the same operation.

At operation 506, a transaction identification is generated. This transaction identification may be, for example, a randomly generated number or character sequence that uniquely identifies the submission. At operation 508, the transaction identification may be encrypted using a first key. At operation 510, the transaction information (either encrypted or not, depending upon whether operation 508 was utilized) is stored in a first column in a first submission table and in a first column in a second submission table in a confidential information database.

At operation 512, the confidential data is encrypted using a second key and stored in a second column of the first submission table in the confidential information database. Then, at operation 514, the identification of the user who submitted the confidential data is separately encrypted using a third key and stored in a second column of the second submission table in the confidential information database.

Additionally, as in FIG. 3, a number of optional pieces of information may, in some example embodiments, be stored in the first and/or second submission tables at this point. At operation 516, a timestamp of the submission of the confidential data may be stored in a column in the second submission table. This timestamp may be used in, for example, a determination of whether the user is eligible to receive insights from confidential data submitted by other users. At operation 518, one or more attributes of the user may be stored as one or more columns in the second submission table. These attributes may be used, for example, in determining to which slice(s) the confidential data may apply, as will be described in more detail below. It should be noted that while operations 516 and 518 are described as placing information in the second submission table, in other example embodiments, one or more of these pieces of information may be stored in the first submission table.

If operation 508 is utilized, then the fact that the transaction identification is encrypted and is the only mechanism by which to link the confidential data in the first submission table with the user identification in the second submission table through a join operation provides an additional layer of security.

Figure 6:
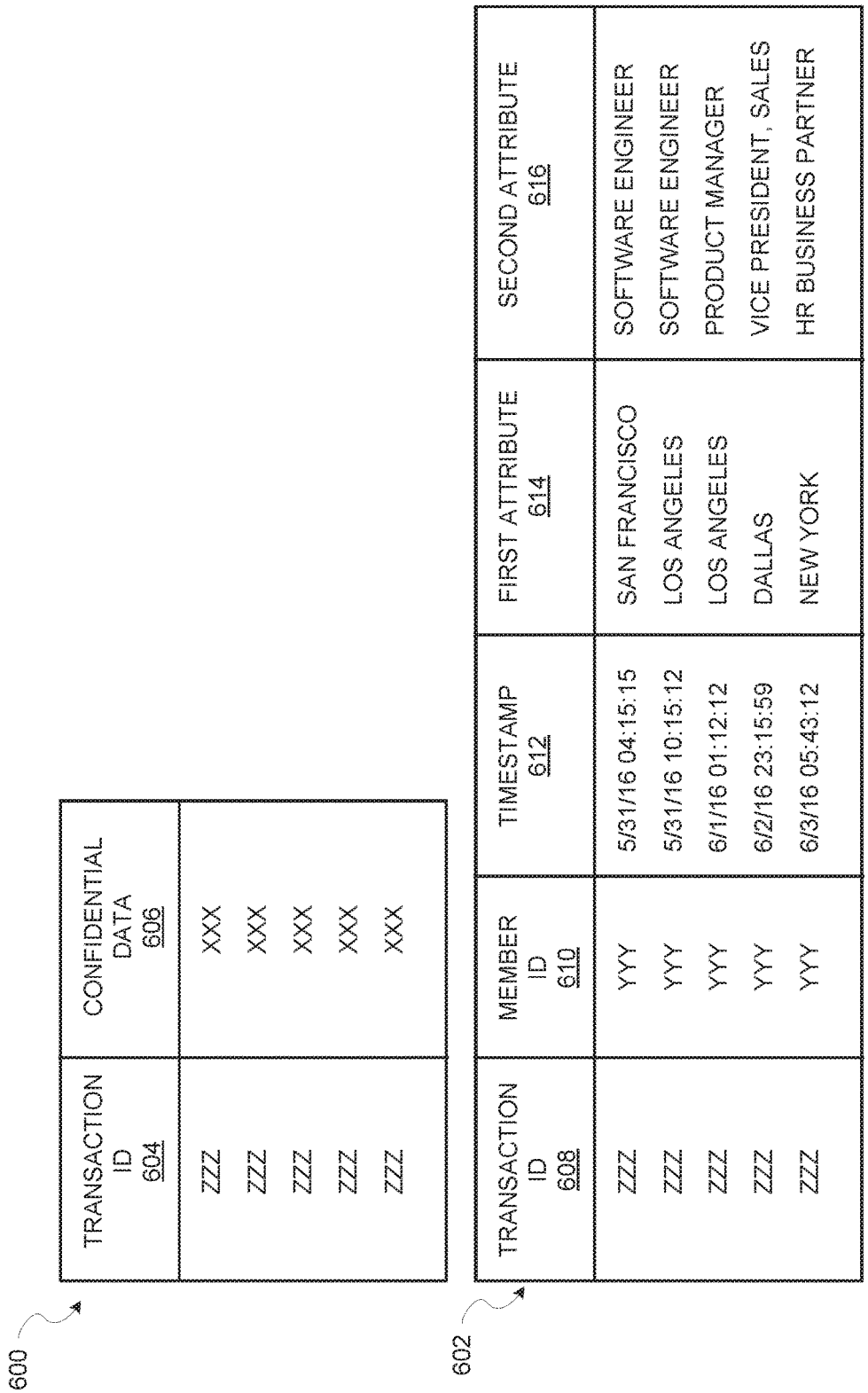
FIG. 6 is a diagram illustrating an example of a first submission table and a second submission table, in accordance with an example embodiment.

FIG. 6 is a diagram illustrating an example of a first submission table 600 and a second submission table 602, in accordance with an example embodiment. Each row in each of the first and second submission tables 600, 602 corresponds to a different submission. Here, the first submission table 600 includes two columns. In a first column 604, transaction identification information encrypted by a first key is stored. In a second column 606, confidential data encrypted by a second key is stored.

The second submission table 602 includes five columns. In a first column 608, transaction identification information encrypted by the first key is stored. In a second column 610, identification of the user who submitted the corresponding confidential data, encrypted by a third key, is stored. In a third column 612, a timestamp for the submission is stored. In a fourth column 614, a first attribute of the user (here location) is stored. In a fifth column 616, a second attribute of the user, here title, is stored. Of course, there may be additional columns to store additional attributes or other pieces of information related to the submission.

Notably, FIG. 6 depicts an example embodiment where only the first and second columns 608, 610 of the second submission table 602 are encrypted, using different encryption keys. In some example embodiments, the additional columns 612-616 may also be encrypted, either individually or together. Furthermore, in some example embodiments, the first and/or second submission tables 600, 602 may be additionally encrypted as a whole, using an additional encryption key(s) different from the keys described previously.

It should be noted that while FIGS. 5 and 6 describe the confidential data as being stored in a single column in a first submission table, in some example embodiments this column is actually multiple columns, or multiple sub-columns, with each corresponding to a subset of the confidential data. For example, if the confidential data is compensation information, the confidential data may actually comprise multiple different pieces of compensation information, such as base salary, bonus, stock, tips, and the like. Each of these pieces of compensation information may, in some example embodiments, have its own column in the first submission table. Nevertheless, the processes described herein with regard to the "column" in which the confidential data is stored apply equally to the embodiments where multiple columns are used (e.g., the individual pieces of compensation information are still encrypted separately from the user identification information).

As described above, there is a need to handle situations where confidential data for certain combinations of cohorts, such as certain combinations of locations and job titles, are sparse. In an example embodiment, a computerized matrix factorization and completion technique may be utilized to infer median/mean values for the confidential data.

The confidential data may be viewed in terms of a matrix where rows pertain to values of cohorts of one attribute type (such as job titles) and columns pertain to values of cohorts of another attribute type (such as locations), with the values in each cell of the matrix comprising submitted confidential data values (such as compensation values) for the corresponding combination of cohort. One issue, however, is that the reliability of the confidential data values may be lacking in certain circumstances, and it may be difficult to differentiate between reliable confidential data values and unreliable confidential data values. For example, if the confidential data values are self-reported salaries, it may be difficult to determine when the contributor of the data was being accurate or inaccurate in the self-reporting. This can lead to certain groupings of confidential data, for example median engineering salaries in s small town, being inaccurate.

In an example embodiment, an expected value for confidential data values for one or more cohorts is estimated using matrix factorization and completion techniques. This may then be compared with the actual submitted values, and if there is significant deviation, it may be suspected that the underlying confidential data is inaccurate and insights for that cohort may not be served. Alternatively, a degree of confidence in the insight may be presented along with the insight. Additionally, future collection of confidential data in such cohorts may be prioritized.

Figure 7:
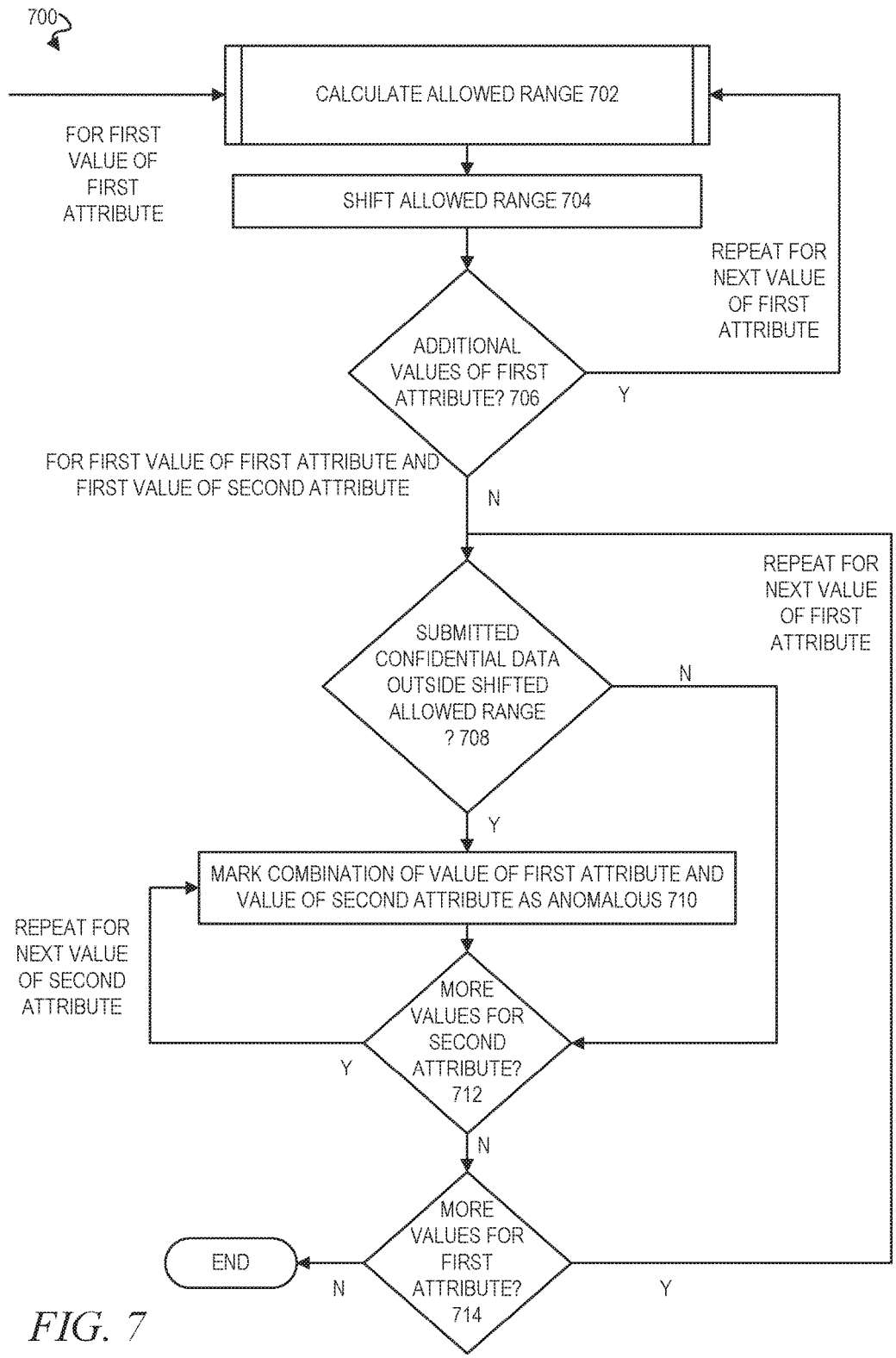
FIG. 7 is a flow diagram illustrating a method of detecting anomalous confidential data values in a computer system, in accordance with an example embodiment.
Figure 8:
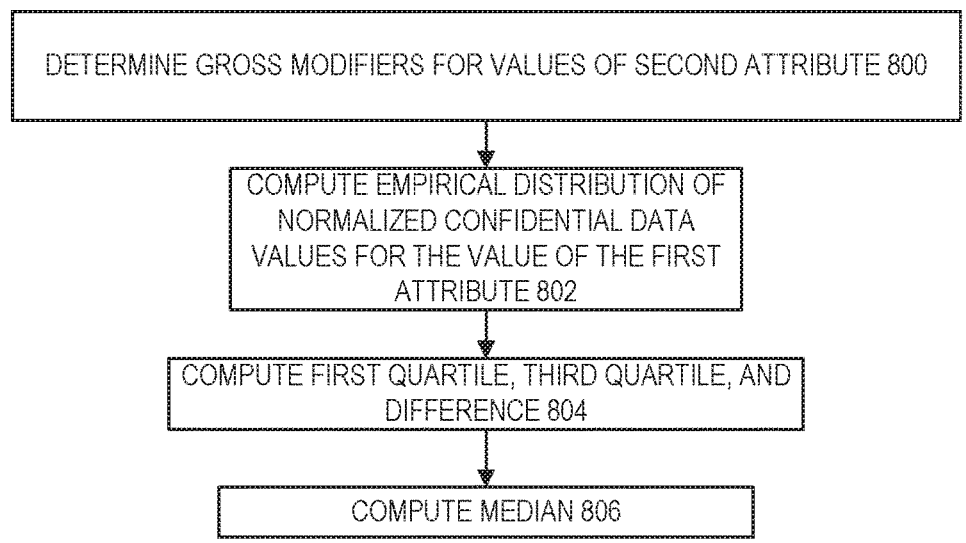
FIG. 8 is a flow diagram illustrating a method of calculating an allowed range for normalized confidential data values submitted by members having the value for the first attribute, in accordance with an example embodiment, in more detail.

FIG. 7 is a flow diagram illustrating a method 700 of detecting anomalous confidential data values in a computer system, in accordance with an example embodiment. A loop is begun for each value of a first attribute (e.g., titles) of members submitting confidential values. At operation 702, an allowed range for normalized confidential data values submitted by members having the value for the first attribute may be calculated, across all values of a second attribute (e.g., locations) of members submitting the confidential value. This results in an allowed range across all values of the second attribute (for example, the allowed range of compensation values for a particular title across all locations). FIG. 8 is a flow diagram illustrating a method of operation 702 for calculating an allowed range for normalized confidential data values submitted by members having the value for the first attribute, in accordance with an example embodiment, in more detail.

At operation 800, gross modifiers for values of the second attribute are determined. This may be accomplished by fixing one value of the second attribute as standard, computing the average (possible weighted) confidential data value for each value of the second attribute, and then dividing that average by that for the fixed standard value of the second attribute. The gross modifier for a given value of the second attribute may be denoted as α(r). Here, both user-submission-based and matrix factorization/completion-inference-based entries can be utilized.

At operation 802, the empirical distribution of normalized confidential data values for the value of the first attribute is computed. This may be performed by looping through each value of the second attribute and, for each value of the second attribute, computing the median or mean confidential data value from members having the value of the first attribute and the value of the second attribute and then dividing this median or mean by the gross modifier for the value of the second attribute.

At operation 804, the Box-and-Whisker method is used to compute a first quartile, a third quartile, and an interquartile range of the third quartile minus the first quartile, thus providing the allowed range. The lower end of the allowed range is denoted as s_lower(t) and the upper end of the allowed range is denoted as s_upper(t).

Then, at operation 806, the second quartile (median) is computed from the empirical distribution of normalized compensation values for the value of the first attribute (t). This may be denoted by s_median(t).

Referring back to FIG. 7, at operation 704, the allowed range is shifted based on an inferred median confidential data value relative to the median. This inferred median confidential data value may be inferred, for example, using matrix factorization and completion techniques, as will be described in more detail later, and denoted as s_infer(t,r). In an example embodiment, this shift may be determined by calculating the following formula for the new shifted range:

range=(s_lower(t)+s_infer(t,r)/α(r)−s_median(t), s_upper(t)+s_infer(t,r)/α(r)−s_median(t))

At operation 706 it may be determined if there are any additional values of the first attribute. If so, then the method 700 loops back to operation 702 for the next value of the first attribute.

If not, then the method 700 may move to evaluating combinations of values of the first attribute and values of the second attribute to determine whether or not the submitted confidential data from members of particular value combinations lies outside the shifted allowed range. If so, then the combinations may be marked as being anomalous. In the embodiment depicted in FIG. 7, a loop may be begun for each value of the first attribute and another loop may be begun for each value of the second attribute, and then the comparison made between the submitted confidential values for the combination against the shifted allowed range for the value of the first attribute. In other words, all combinations are examined and marked. In other example embodiments, the comparison may be made to a subset of combinations or even just to a single combination at runtime for evaluation.

At operation 708, it is determined if the submitted confidential data from members having the value of the first attribute and having the value of the second attribute is outside the shifted allowed range for the value of the first attribute. If so, then at operation 710 the combination of the value of the first attribute and the value of the second attribute is marked as anomalous, and then the method proceeds to operation 712. If not, the method 700 proceeds directly to operation 712.

At operation 712, it is determined if there are any more values for the second attribute. If so, then the method 700 loops back to operation 710 for the next value of the second attribute. If not, then at operation 714, it is determined if there are any more values for the first attribute. If so, then the method 700 loops back to operation 708 for the next value of the first attribute. If not, then the method 700 ends.

Figure 9:
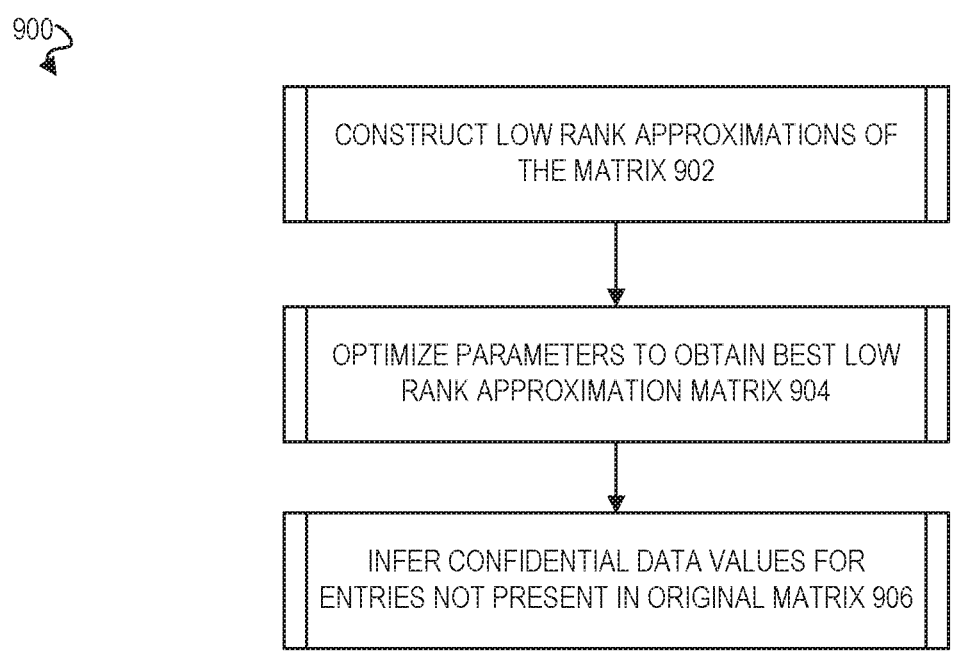
FIG. 9 is a flow diagram illustrating a method of inferring median/mean confidential data values in accordance with an example embodiment.

FIG. 9 is a flow diagram illustrating a method 900 of inferring median/mean confidential data values in accordance with an example embodiment. First, at operation 902, low rank approximations of a matrix with the first attribute on one axis and the second attribute on another axis may be constructed. This operation takes as input a set of median confidential data values for an available set of attribute cohort combinations, along with corresponding confidence scores (if available). The confidence scores may be generated if, for example, some of the median confidential data values have themselves been inferred via a machine learning model, which would also output a confidence score indicating the confidence level of the predicted median confidence value. Also taken as input would be a set F of candidate data transformation functions, such as identity, natural logarithm, square root, etc. In one example embodiment these candidate data transformation functions may be monotonic. Also taken as input would be a desired error measure. This may include, for example:

1. $(\|M\_k-X\|\_{hidden})/\|X\|\_{hidden}$, where $\|X\|\_{hidden}$ denotes Frobenius norm (Euclidean norm of the matrix treated as a vector) of matrix X restricted to the hidden entries and M_k denotes the rank-k approximation to matrix X
2. The max relative deviation in the median base salary over the hidden entries: $\max\_\{1<=i<=m, 1<=j<=n, (i,j) \text{ is hidden}\} |M\_k(i,j)-X(i,j)|/X(i,j)$, where M_k denotes the rank-k approximation to matrix X.
3. The mean relative deviation in the median base salary over the hidden entries: $\text{mean}\_\{1<=i<=m, 1<=j<=n, (i,j) \text{ is hidden}\}|M\_k(i,j)-X(i,j)|/X(i,j)$, where M_k denotes the rank-k approximation to matrix X.
4. The median relative deviation in the median base salary over the hidden entries: $\text{median}\_\{1<=i<=m, 1<=j<=n, (i,j) \text{ is hidden}\}|M\_k(i,j)-X(i,j)|/X(i,j)$, where M_k denotes the rank-k approximation to matrix X.

Figure 10:
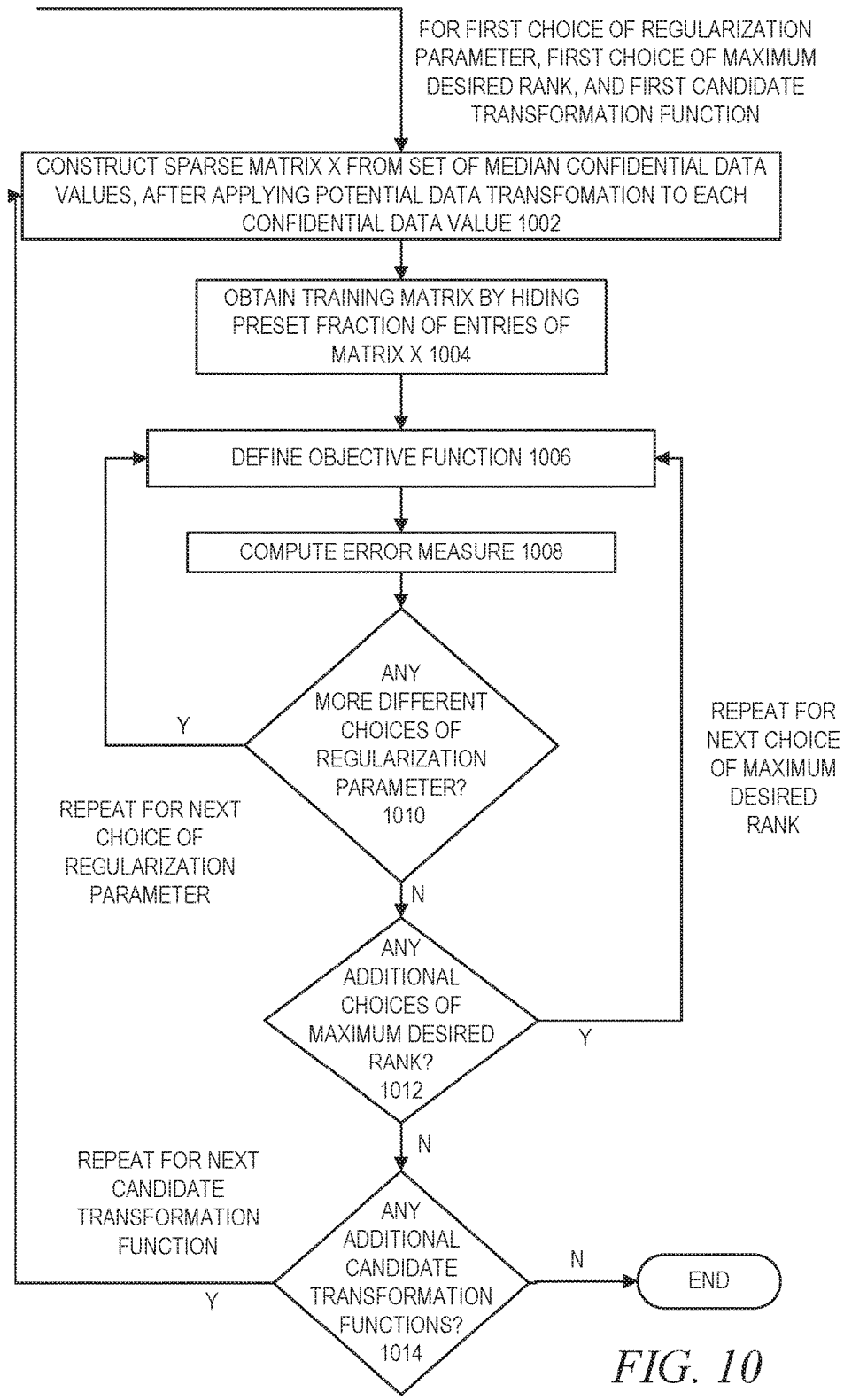
FIG. 10 is a flow diagram illustrating a method of constructing low rank approximations of the matrix, in accordance with an example embodiment.

Output of this operation may be a set of candidate low rank approximations, corresponding to different data transformations and different choices of parameters. FIG. 10 is a flow diagram illustrating a method of operation 902 of constructing low rank approximations of the matrix, in accordance with an example embodiment.

For each of a plurality of different potential data transformations (e.g., each f in F), a loop is begun. At operation 1002, a sparse matrix X is constructed from the set of median confidential data values, after applying the potential data transformation f to each confidential data value. In general, X could contain missing entries, since the compensation value may not be available for all (title, location) pairs.

At operation 1004, a training matrix (X_train) is obtained by hiding a preset fraction of entries of the matrix X randomly (or pseudo-randomly). At operation 1006, an objective function may be defined by minimizing $\|X\_train-M\|^2_o + 2 \cdot \lambda \cdot \|M\|^*$ such that M has rank at most k. Here, the first term refers to the Frobenius norm of the difference, restricted to non-missing entries of X_train. The second term refers to the nuclear norm of matrix M, that is, the sum of singular values of M.

A loop is then begun for each different choice of the regularization parameter $\lambda$, each different choice of the maximum desired rank, k. M_k is computed as the matrix M that minimizes the objective. If X_train were a complete matrix with rank r, the optimal solution is given by U. D_$\lambda$. V where:
  i. U. D. V is the singular value decomposition of X_train, with D is a diagonal matrix with entries d1, ..., dr
  ii. D_$\lambda$ is a diagonal matrix obtained from D by performing soft thresholding, that is, its entries are max(d1-$\lambda$, 0), ..., max(dr-$\lambda$, 0).

At operation 1008, the error measure is computed by comparing the recovered matrix, M_k and the original matrix, X with respect to the hidden entries (these entries were not used in the above optimization, and hence can be thought of as forming the test/validation set).

At operation 1010, it is determined if there are any more different choices of the regularization parameter $\lambda$. If so, then the method 902 loops back to operation 1006 for the next choice of regularization parameter $\lambda$. If not, then at operation 1012, it is determined if there are any additional choices of maximum desired rank k. If so, then the method 902 loops back to operation 1006 for the next choice of maximum desired rank k. If not, then at operation 1014, it is determined if there are any additional candidate data transformation functions. If so, then the method 902 loops back to operation 1002 for the next data transformation function.

In some example embodiments of the above method, the objective function could also take into account weights for different attribute combinations, for example, in terms of the confidence score:

Minimize sum_{(i,j) is present in X_train} s_conf(i,j). (X_train(i,j)-M(i,j))2+$\lambda$. $\|M\|^*$ such that M has rank at most k, Where s_conf(i,j) is the weight for (i,j) title-region pair.

Similarly, different variants could be considered where different models could be constructed, such as
  a. For each country.
  b. For each function (or some other clustering of the titles based on pay variation across regions).
  c. A combination of the two.

Figure 11:
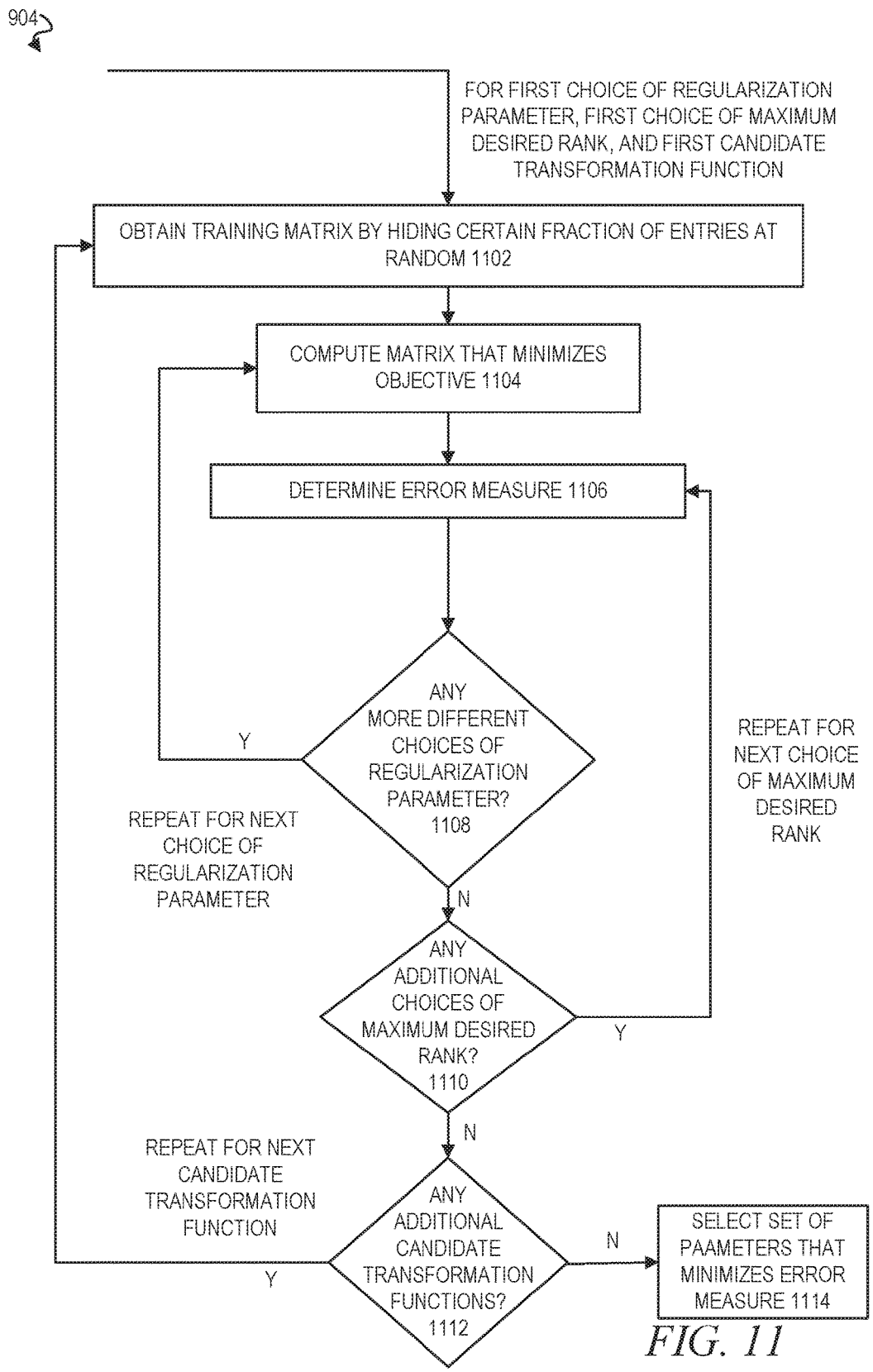
FIG. 11 is a flow diagram illustrating a method for optimizing parameters to obtain the best low rank approximation matrix in accordance with an example embodiment.

Referring back to FIG. 9, at operation 904, parameters are optimized to obtain the best low rank approximation matrix. FIG. 11 is a flow diagram illustrating a method 904 for optimizing parameters to obtain the best low rank approximation matrix in accordance with an example embodiment. A loop is begun for each candidate data transformation. At operation 1002, a sparse matrix X is constructed from the set of median confidential data values, after applying the candidate data transformation to each confidential data value. At operation 1104, the matrix X_train is obtained by hiding a certain fraction of entries of X at random (e.g., 10% so that X_train contains 90% of the entries of X). A loop is then begun for each different choice of the regularization parameter $\lambda$, each different choice of the maximum desired rank, k. At operation 1106 M_k is computed as the matrix M that minimizes the objective. At operation 1108, the error measure is determined by comparing the recovered matrix, M_k, and the original matrix, X, with respect to the hidden entries (these entries were not used in the above optimization, and hence can be thought of as forming the test/validation set).

At operation 1110, it is determined if there are any more different choices of the regularization parameter $\lambda$. If so, then the method loops back to operation 1104 for the next choice of regularization parameter $\lambda$. If not, then at operation 1110, it is determined if there are any additional choices of maximum desired rank k. If so, then the method loops back to operation 1106 for the next choice of maximum desired rank k. If not, then at operation 1114 it is determined if there are any additional candidate data transformation functions. If so, then the method 9020 loops back to operation 1102 for the next data transformation function.

If not, then at operation 1114, the set of parameters that minimizes the above error measure is selected, thereby obtaining the optimal data transformation function, regularization parameter, and maximum desired rank.

Figure 12:
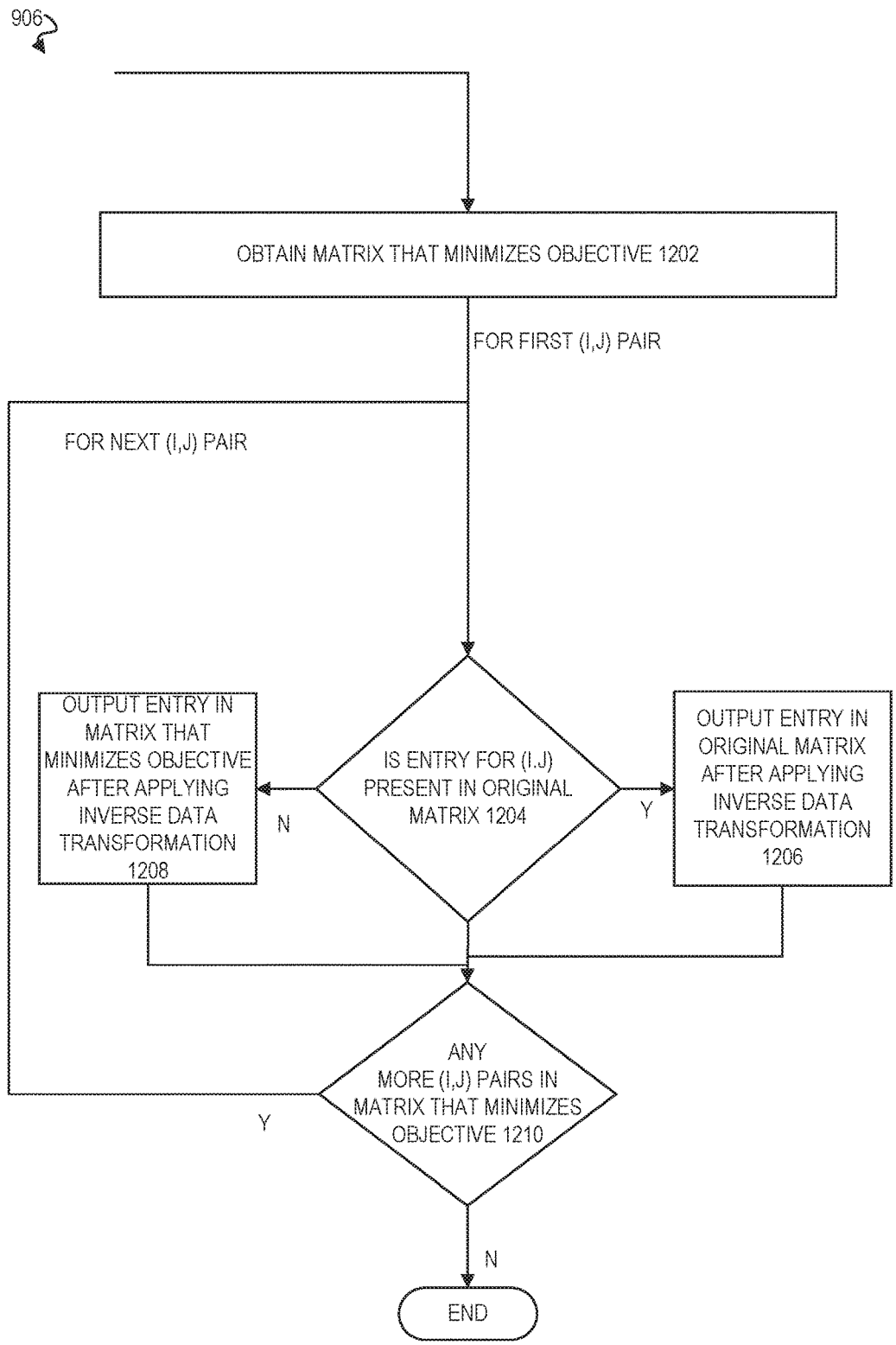
FIG. 12 is a flow diagram illustrating a method of inferring confidential data values for entries not present in the original matrix, in accordance with an example embodiment.

Referring back to FIG. 9, at operation 906, confidential data values for entries not present in the original matrix are inferred. FIG. 12 is a flow diagram illustrating a method of operation 906 of inferring confidential data values for entries not present in the original matrix, in accordance with an example embodiment. At operation 1202, the matrix M_opt as the matrix that minimizes the above objective, under the optimal set of parameter choices, is obtained. Then a loop is begun for each (i,j) pair in M_opt, with i and j being dimensions of the matrix. At operation 1204, it is determined if the entry for (i,j) is present in the original matrix, X. If so, then at operation 1206, that entry is output after applying the inverse data transformation. Otherwise, at operation 1208, M_opt(i,j) is output after applying the inverse data transformation. At operation 1210, it is determined if there are any more (i,j) pairs in M_opt. If so, then the method of operation 906 loops back to operation 1204 for the next (i,j) pair. If not, then the method of operation 906 ends.

The result is a modified matrix M_opt with inferred medians/means for sparse cells in the original matrix.

In another example embodiment, anomalous confidential data values in a computer system are detected using external data sources. As with the method described above, anomalous confidential data may be suspected as inaccurate and insights for that cohort may not be served. Alternatively, a degree of confidence in the insight may be presented along with the insight. Additionally, future collection of confidential data in such cohorts may be prioritized.

A deviation tolerance parameter $\beta$ may be specified. An external data set of confidential data values, such as from the Bureau of Labor Statistics, may be accessed. Data from this external data set can be designated B with data from member-submitted data denoted as M. Both datasets may utilize the same taxonomy for the first and second attributes.

Both datasets may also be missing entries for certain combinations of values of the first and second attributes.

An optimum multiplier, $\alpha$, may be computed for external dataset B that minimizes the magnitude of the deviation from user collected data M, and corresponding minimum mean weighted (relative) deviation, $\Delta$. This is because the external dataset could be from a slightly earlier period (resulting in, for example, a lower salary multiple), or from a slightly different distribution than user-collected data, and hence it would be beneficial to identify anomalous entries after applying a correction to the external dataset compensation.

In one alternative embodiment, mean weighted relative deviation may be minimized:

$\alpha = \arg\min [\sum_{(t,r) \text{ such that both } B(t,r) \text{ and } M(t,r) \text{ are present}} w(t,r) \cdot |M(t,r) - \alpha B(t,r)|/M(t,r)]/[\sum_{(t,r) \text{ such that both } B(t,r) \text{ and } M(t,r) \text{ are present}} w(t,r)]$, where $w(t,r)$ is the weight for value t of the first attribute and value r of the second attribute. This may be computed in several ways, for example, as the fraction of members with value t and value r.

Then the minimal mean weighted relative deviation is $\Delta^*$(value of the above objective function at $\alpha$). $\Delta = [\sum_{(t,r) \text{ such that both } B(t,r) \text{ and } M(t,r) \text{ are present}} w(t,r) \cdot |M(t,r) - \alpha^* B(t,r)|/M(t,r)]/[\sum_{(t,r) \text{ such that both } B(t,r) \text{ and } M(t,r) \text{ are present}} w(t,r)]$ In another example embodiment, the mean weighted deviation may be minimized as follows:

$\alpha = \arg\min [\sum_{(t,r) \text{ such that both } B(t,r) \text{ and } M(t,r) \text{ are present}} w(t,r) \cdot |M(t,r) - \alpha^* B(t,r)|]/[\sum_{(t,r) \text{ such that both } B(t,r) \text{ and } M(t,r) \text{ are present}} w(t,r)]$, where $w(t,r)$ is the weight for value t and value r. This can be computed in several ways, for example, as the fraction of members with value t and value r.

Then the minimal mean weighted relative deviation is $\Delta^*$(value of the above objective function at $\alpha$). $\Delta = [\sum_{(t,r) \text{ such that both } B(t,r) \text{ and } M(t,r) \text{ are present}} w(t,r) \cdot |M(t,r) - \alpha^* B(t,r)|]/[\sum_{(t,r) \text{ such that both } B(t,r) \text{ and } M(t,r) \text{ are present}} w(t,r)]$.

Then the allowed deviation can be computed as $\gamma = \Delta^* \beta$. For each (t,r) pair present in the user collected data, (t, r) is then marked as having anomalous compensation (from user collected data) if Variant 1: $|M(t,r) - \alpha^* B(t,r)|/M(t,r) > \gamma$ Variant 2: $|M(t,r) - \alpha^* B(t,r)| > \gamma$ The multiplier can then be optimized for different segments, such as by function or by city/state.

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-12 are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "Internet of Things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 13:
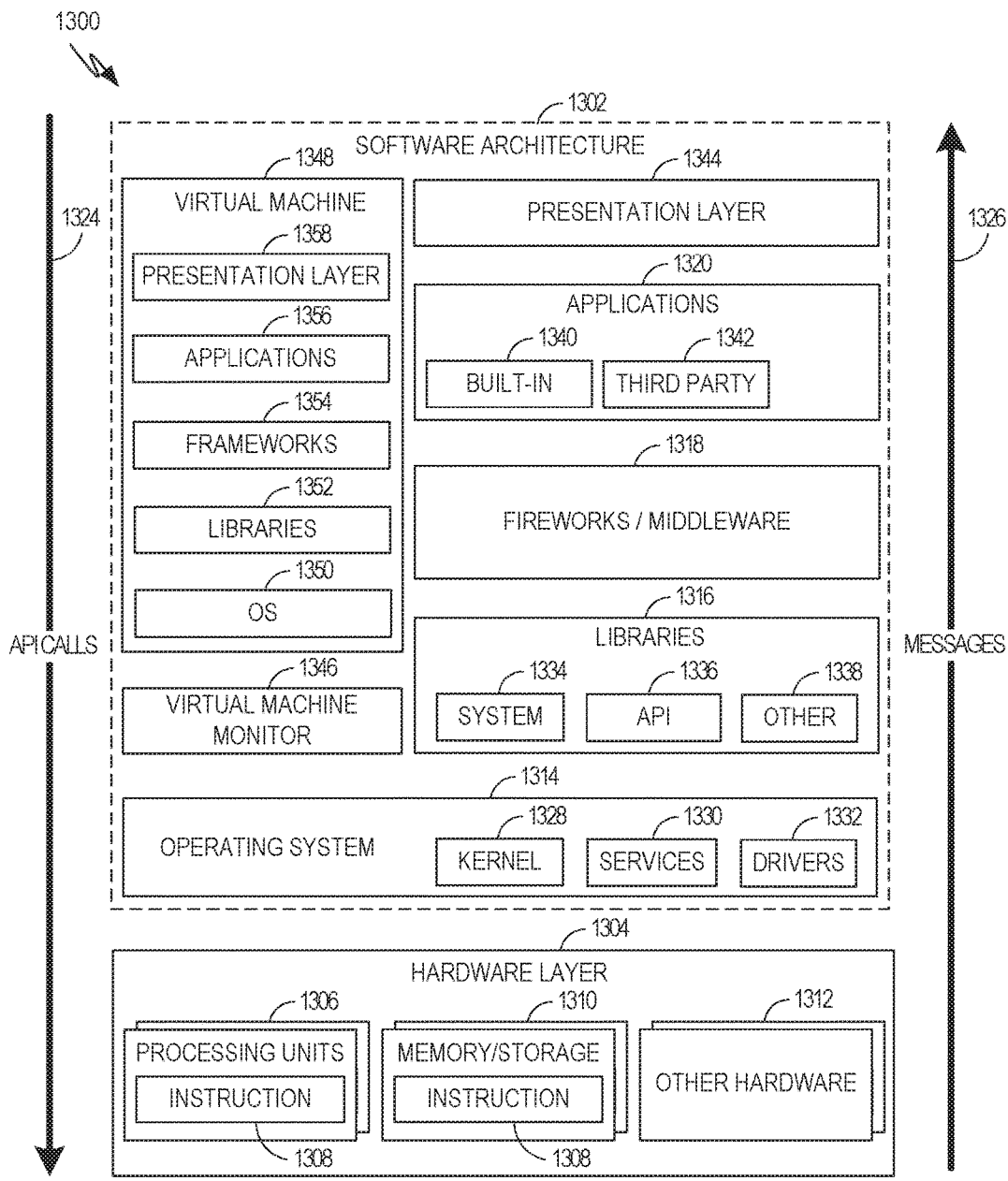
FIG. 13 is a block diagram illustrating a representative software architecture, which may be used in conjunction with various hardware architectures herein described.

FIG. 13 is a block diagram 1300 illustrating a representative software architecture 1302, which may be used in conjunction with various hardware architectures herein described. FIG. 13 is merely a non-limiting example of a software architecture, and it will be appreciated that many other architectures may be implemented to facilitate the functionality described herein. The software architecture 1302 may be executing on hardware such as a machine 1400 of FIG. 14 that includes, among other things, processors 1410, memory/storage 1430, and I/O components 1450. A representative hardware layer 1304 is illustrated and can represent, for example, the machine 1400 of FIG. 14. The representative hardware layer 1304 comprises one or more processing units 1306 having associated executable instructions 1308. The executable instructions 1308 represent the executable instructions of the software architecture 1302, including implementation of the methods, modules, and so forth of FIGS. 1-12. The hardware layer 1304 also includes memory and/or storage modules 1310, which also have the executable instructions 1308. The hardware layer 1304 may also comprise other hardware 1312, which represents any other hardware of the hardware layer 1304, such as the other hardware illustrated as part of the machine 1400.

In the example architecture of FIG. 13, the software architecture 1302 may be conceptualized as a stack of layers where each layer provides particular functionality. For example, the software architecture 1302 may include layers such as an operating system 1314, libraries 1316, frameworks/middleware 1318, applications 1320, and a presentation layer 1344. Operationally, the applications 1320 and/or other components within the layers may invoke API calls 1324 through the software stack and receive responses, returned values, and so forth, illustrated as messages 1326, in response to the API calls 1324. The layers illustrated are representative in nature and not all software architectures have all layers. For example, some mobile or special-purpose operating systems may not provide a layer of frameworks/middleware 1318, while others may provide such a layer. Other software architectures may include additional or different layers.

The operating system 1314 may manage hardware resources and provide common services. The operating system 1314 may include, for example, a kernel 1328, services 1330, and drivers 1332. The kernel 1328 may act as an abstraction layer between the hardware and the other software layers. For example, the kernel 1328 may be responsible for memory management, processor management (e.g., scheduling), component management, networking, security settings, and so on. The services 1330 may provide other common services for the other software layers. The drivers 1332 may be responsible for controlling or interfacing with the underlying hardware. For instance, the drivers 1332 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1316 may provide a common infrastructure that may be utilized by the applications 1320 and/or other components and/or layers. The libraries 1316 typically provide functionality that allows other software modules to perform tasks in an easier fashion than by interfacing directly with the underlying operating system 1314 functionality (e.g., kernel 1328, services 1330, and/or drivers 1332). The libraries 1316 may include system libraries 1334 (e.g., C standard library) that may provide functions such as memory allocation functions, string manipulation functions, mathematical functions, and the like. In addition, the libraries 1316 may include API libraries 1336 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1316 may also include a wide variety of other libraries 1338 to provide many other APIs to the applications 1320 and other software components/modules.

The frameworks 1318 (also sometimes referred to as middleware) may provide a higher-level common infrastructure that may be utilized by the applications 1320 and/or other software components/modules. For example, the frameworks 1318 may provide various graphic user interface (GUI) functions, high-level resource management, high-level location services, and so forth. The frameworks 1318 may provide a broad spectrum of other APIs that may be utilized by the applications 1320 and/or other software components/modules, some of which may be specific to a particular operating system or platform.

The applications 1320 include built-in applications 1340 and/or third-party applications 1342. Examples of representative built-in applications 1340 may include, but are not limited to, a contacts application, a browser application, a book reader application, a location application, a media application, a messaging application, and/or a game application. The third-party applications 1342 may include any of the built-in applications 1340 as well as a broad assortment of other applications. In a specific example, the third-party application 1342 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1342 may invoke the API calls 1324 provided by the mobile operating system such as the operating system 1314 to facilitate functionality described herein.

The applications 1320 may utilize built-in operating system 1314 functions (e.g., kernel 1328, services 1330, and/or drivers 1332), libraries 1316 (e.g., system libraries 1334, API libraries 1336, and other libraries 1338), and frameworks/middleware 1318 to create user interfaces to interact with users of the system. Alternatively, or additionally, in some systems, interactions with a user may occur through a presentation layer, such as the presentation layer 1344. In these systems, the application/module "logic" can be separated from the aspects of the application/module that interact with a user.

Some software architectures utilize virtual machines. In the example of FIG. 13, this is illustrated by a virtual machine 1348. A virtual machine creates a software environment where applications/modules can execute as if they were executing on a hardware machine (such as the machine 1400 of FIG. 14, for example). A virtual machine is hosted by a host operating system (e.g., operating system 1314 in FIG. 13) and typically, although not always, has a virtual machine monitor 1346, which manages the operation of the virtual machine 1348 as well as the interface with the host operating system (e.g., operating system 1314). A software architecture executes within the virtual machine 1348, such as an operating system 1350, libraries 1352, frameworks/middleware 1354, applications 1356, and/or a presentation layer 1358. These layers of software architecture executing within the virtual machine 1348 can be the same as corresponding layers previously described or may be different.

Example Machine Architecture and Machine-Readable Medium

Figure 14:
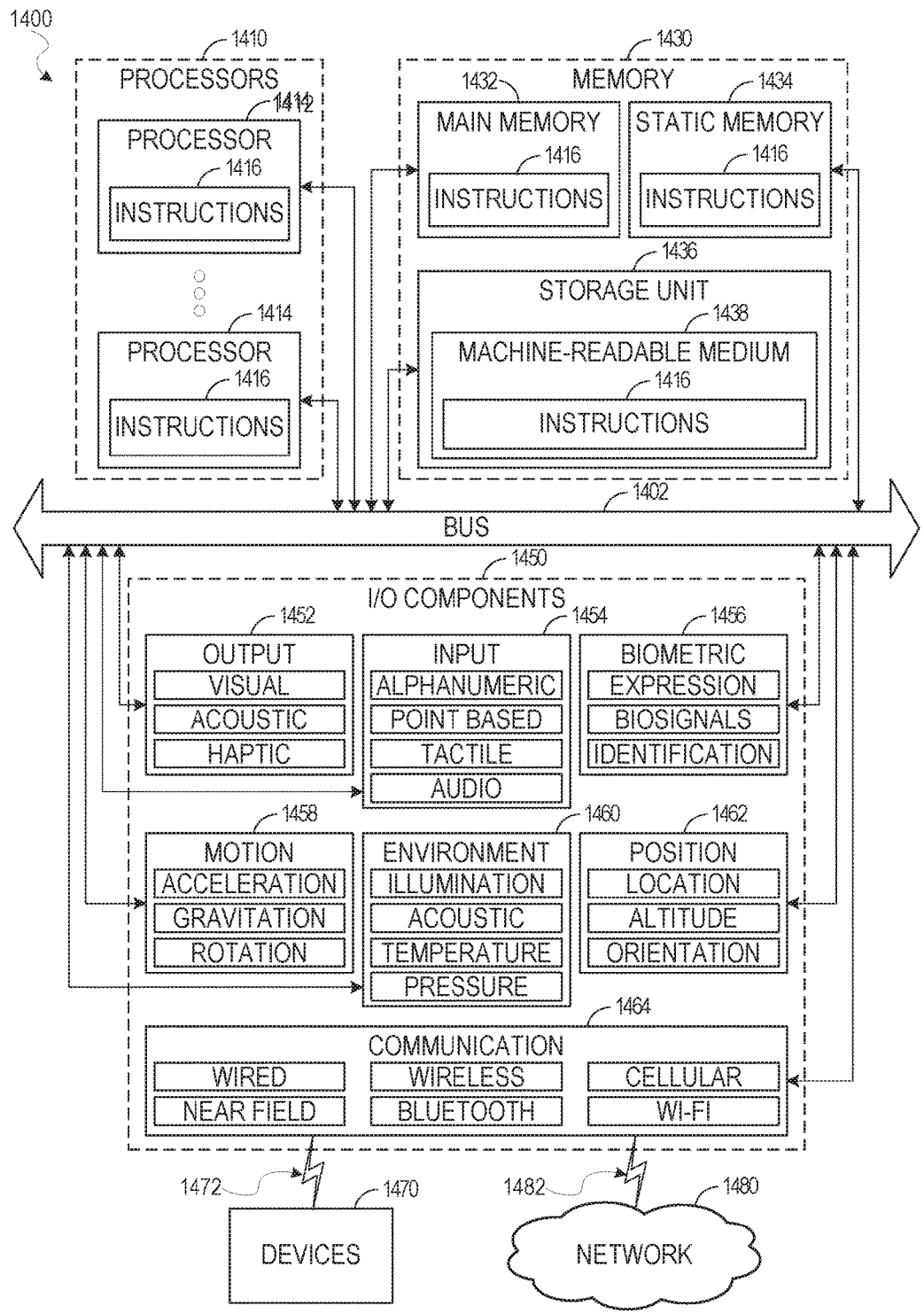
FIG. 14 is a block diagram illustrating components of a machine, according to some example embodiments, able to read instructions from a machine-readable medium (e.g., a machine-readable storage medium) and perform any one or more of the methodologies discussed herein.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. The instructions 1416 transform the general, non-programmed machine into a particular machine programmed to carry out the described and illustrated functions in the manner described. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory/storage 1430, and I/O components 1450, which may be configured to communicate with each other such as via a bus 1402. In an example embodiment, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1412 and a processor 1414 that may execute the instructions 1416. The term "processor" is intended to include multi-core processors that may comprise two or more independent processors (sometimes referred to as "cores") that may execute the instructions 1416 contemporaneously. Although FIG. 14 shows multiple processors 1410, the machine 1400 may include a single processor with a single core, a single processor with multiple cores (e.g., a multi-core processor), multiple processors with a single core, multiple processors with multiples cores, or any combination thereof.

The memory/storage 1430 may include a memory 1432, such as a main memory, or other memory storage, and a storage unit 1436, both accessible to the processors 1410 such as via the bus 1402. The storage unit 1436 and memory 1432 store the instructions 1416 embodying any one or more of the methodologies or functions described herein. The instructions 1416 may also reside, completely or partially, within the memory 1432, within the storage unit 1436, within at least one of the processors 1410 (e.g., within the processor's cache memory), or any suitable combination thereof, during execution thereof by the machine 1400. Accordingly, the memory 1432, the storage unit 1436, and the memory of the processors 1410 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by one or more processors of the machine (e.g., processors 1410), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1450 may include a wide variety of components to receive input, provide output, produce output, transmit information, exchange information, capture measurements, and so on. The specific I/O components 1450 that are included in a particular machine will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1450 may include biometric components 1456, motion components 1458, environmental components 1460, or position components 1462, among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1462 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or other suitable device to interface with the network 1480. In further examples, the communication components 1464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a USB).

Moreover, the communication components 1464 may detect identifiers or include components operable to detect identifiers. For example, the communication components 1464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF414, Ultra Code, UCC RSS-2D bar code, and other optical codes), or acoustic detection components (e.g., microphones to identify tagged audio signals). In addition, a variety of information may be derived via the communication components 1464, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1480 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., Hypertext Transfer Protocol (HTTP)). Similarly, the instructions 1416 may be transmitted or received using a transmission medium via the coupling 1472 (e.g., a peer-to-peer coupling) to the devices 1470. The term "transmission medium" shall be taken to include any intangible medium that is capable of storing, encoding, or carrying the instructions 1416 for execution by the machine 1400, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
one or more hardware processors;
a non-transitory computer-readable medium having instructions stored thereon, which, when executed by the one or more hardware processors, cause the system to:
for each value of a plurality of values of a first attribute of members of a social networking service who have submitted confidential data:
calculate, using the one or more hardware processors, an allowed range for confidential data values submitted by members having the value for the first attribute, across all values of a second attribute, the confidential data values having been entered on screens of graphical user interfaces and encrypted on an external data source;
calculate, using the one or more hardware processors, a median for the confidential data values by selecting a midpoint in a distribution of the confidential data values;
identify a set of candidate data transformation functions, each candidate data transformation function applying a different function on the confidential data values;
shift, using the one or more hardware processors, the allowed range based on an inferred median confidential data value relative to the median of the confidential data values, the inferred median confidential data value being inferred by optimizing parameters of an objective function that minimize an error function for the objective function to select one candidate data transformation functions from the set of candidate data transformation functions, applying the selected one candidate data transformation function to the confidential data values to transform the confidential data values, and calculating a median for the transformed confidential data values;
for each value of the plurality of values of the first attribute of members of the social networking service who have submitted confidential data and each value of a plurality of values of the second attribute of members of the social networking service who have submitted confidential data:
determine, using the one or more hardware processors, whether the submitted confidential data from members having the value of the first attribute and the value of the second attribute is outside the shifted allowed range for the value of the first attribute; and
in response to a determination that the submitted confidential data from members having the value of the first attribute and the value of the second attribute is outside the shifted allowed range for the value of the first attribute, mark, using the one or more hardware processors, a combination of the value of the first attribute and the value of the second attribute as anomalous.

2. The system of claim 1, wherein the calculating an allowed range includes:
   computing an empirical distribution of the confidential data values for the value of the first attribute;
   computing an upper and lower end of the allowed range from the empirical distribution; and
   calculating a median for the allowed range from the empirical distribution.

3. The system of claim 1, wherein the shifting includes inferring a median confidential data value using matrix factorization.

4. The system of claim 3, wherein the inferring comprises:
   constructing a matrix of the confidential data values having the first attribute as a first axis and the second attribute as a second axis, with each cell in the matrix corresponding to corresponding different combinations of values of the first attribute and the second attribute;
   computing a set of candidate low rank approximations of the matrix using an objective function evaluated using a set of candidate data transformation functions, the objective function having one or more parameters and an error function;
   optimizing the one or more parameters that minimizes the error function of the objective function to select one of the candidate low rank approximations of the matrix; and
   inferring one or more cells that are missing data, of the selected one of the candidate low rank approximations of the matrix.

5. The system of claim 4, wherein the constructing the matrix includes using a machine learning model to generate median confidential data values for one or more cells along with corresponding confidence scores.

6. The system of claim 4, wherein the computing the set of candidate low rank approximations includes, for each candidate data transformation:
   applying the candidate data transformation to the matrix;
   obtaining a training matrix by hiding a preset fraction of entries of the transformed matrix; and
   for each of one or more candidate parameter values for one of the one or more parameters:
      computing the objective function using the candidate parameter value; and
      calculating the error function using the candidate parameter value.

7. The system of claim 4, wherein the inferring the one or more cells that are missing data includes:
   for each cell that is missing data, of the selected one of the candidate low rank approximations of the matrix:
      determining if the cell that is missing data is present in the matrix of the confidential data values; and
      in response to a determination that the cell that is missing data is present in the matrix of confidential data values, applying an inverse of the selected candidate low rank approximations to the cell that is missing data.

8. A method comprising:
   for each value of a plurality of values of a first attribute of members of a social networking service who have submitted confidential data:
      calculating, using one or more hardware processors, an allowed range for confidential data values submitted by members having the value for the first attribute, across all values of a second attribute, the confidential data values having been entered on screens of graphical user interfaces and encrypted on an external data source;
      calculating, using the one or more hardware processors, a median for the confidential data values by selecting a midpoint in a distribution of the confidential data values;
      identifying a set of candidate data transformation functions, each candidate data transformation function applying a different function on the confidential data values;
      shifting, using the one or more hardware processors, the allowed range based on an inferred median confidential data value relative to the median of the confidential data values, the inferred median confidential data value being inferred by optimizing parameters of an objective function that minimize an error function for the objective function to select one candidate data transformation functions from the set of candidate data transformation functions, applying the selected one candidate data transformation function to the confidential data values to transform the confidential data values, and calculating a median for the transformed confidential data values;
   for each value of the plurality of values of the first attribute of members of the social networking service who have submitted confidential data and each value of a plurality of values of the second attribute of members of the social networking service who have submitted confidential data:
      determining, using the one or more hardware processors, whether the submitted confidential data from members having the value of the first attribute and the value of the second attribute is outside the shifted allowed range for the value of the first attribute; and
      in response to a determination that the submitted confidential data from members having the value of the first attribute and the value of the second attribute is outside the shifted allowed range for the value of the first attribute, marking, using the one or more hardware processors, a combination of the value of the first attribute and the value of the second attribute as anomalous.

9. The method of claim 8, wherein the calculating an allowed range includes:
   computing an empirical distribution of the confidential data values for the value of the first attribute;
   computing an upper and lower end of the allowed range from the empirical distribution; and
   calculating a median for the allowed range from the empirical distribution.

10. The method of claim 8, wherein the shifting includes inferring a median confidential data value using matrix factorization.

11. The method of claim 10, wherein the inferring comprises:
   constructing a matrix of the confidential data values having the first attribute type as a first axis and the second attribute type as a second axis, with each cell in the matrix corresponding to corresponding different combinations of values of the first attribute and the second attribute;
   computing a set of candidate low rank approximations of the matrix using an objective function evaluated using a set of candidate data transformation functions, the objective function having one or more parameters and an error function;

optimizing the one or more parameters that minimizes the error function of the objective function to select one of the candidate low rank approximations of the matrix; and inferring one or more cells that are missing data, of the selected one of the candidate low rank approximations of the matrix.

12. The method of claim 10, wherein the constructing the matrix includes using a machine learning model to generate median confidential data values for one or more cells along with corresponding confidence scores.

13. The method of claim 10, wherein the computing a set of candidate low rank approximations includes, for each candidate data transformation:

applying the candidate data transformation to the matrix;

obtaining a training matrix by hiding a preset fraction of entries of the transformed matrix; and for each of one or more candidate parameter values for one of the one or more parameters:

computing the objective function using the candidate parameter value; and calculating the error function using the candidate parameter value.

14. The method of claim 11, wherein the inferring the one or more cells that are missing data includes:

for each cell that is missing data, of the selected one of the candidate low rank approximations of the matrix:

determining if the cell that is missing data is present in the matrix of the confidential data values; and in response to a determination that the cell that is missing data is present in the matrix of confidential data values, applying an inverse of the selected candidate low rank approximations to the cell that is missing data.

15. A non-transitory machine-readable storage medium comprising instructions, which when implemented by one or more machines, cause the one or more machines to perform operations comprising:

for each value of a plurality of values of a first attribute of members of a social networking service who have submitted confidential data:

calculating, using one or more hardware processors, an allowed range for confidential data values submitted by members having the value for the first attribute, across all values of a second attribute, the confidential data values having been entered on screens of graphical user interfaces and encrypted on an external data source;

calculating, using the one or more hardware processors, a median for the confidential data values by selecting a midpoint in a distribution of the confidential data values;

identifying a set of candidate data transformation functions, each candidate data transformation function applying a different function on the confidential data values;

shifting, using the one or more hardware processors, the allowed range based on an inferred median confidential data value relative to the median of the confidential data values, the inferred median confidential data value being inferred by optimizing parameters of an objective function that minimize an error function for the objective function to select one candidate data transformation functions from the set of candidate data transformation functions, applying the selected one candidate data transformation function to the confidential data values to transform the confidential data values, and calculating a median for the transformed confidential data values;

for each value of the plurality of values of the first attribute of members of the social networking service who have submitted confidential data and each value of a plurality of values of the second attribute of members of the social networking service who have submitted confidential data:

determining, using the one or more hardware processors, whether the submitted confidential data from members having the value of the first attribute and the value of the second attribute is outside the shifted allowed range for the value of the first attribute; and in response to a determination that the submitted confidential data from members having the value of the first attribute and the value of the second attribute is outside the shifted allowed range for the value of the first attribute, marking, using the one or more hardware processors, a combination of the value of the first attribute and the value of the second attribute as anomalous.

16. The non-transitory machine-readable storage medium of claim 15, wherein the calculating an allowed range includes:

computing an empirical distribution of the confidential data values for the value of the first attribute;

computing an upper and lower end of the allowed range from the empirical distribution; and calculating a median for the allowed range from the empirical distribution.

17. The non-transitory machine-readable storage medium of claim 15, wherein the shifting includes inferring a median confidential data value using matrix factorization.

18. The non-transitory machine-readable storage medium of claim 15, wherein the inferring comprises:

constructing a matrix of the confidential data values having the first attribute type as a first axis and the second attribute type as a second axis, with each cell in the matrix corresponding to corresponding different combinations of values of the first attribute and the second attribute;

computing a set of candidate low rank approximations of the matrix using an objective function evaluated using a set of candidate data transformation functions, the objective function having one or more parameters and an error function;

optimizing the one or more parameters that minimizes the error function of the objective function to select one of the candidate low rank approximations of the matrix; and inferring one or more cells that are missing data, of the selected one of the candidate low rank approximations of the matrix.

19. The non-transitory machine-readable storage medium of claim 18, wherein the constructing the matrix includes using a machine learning model to generate median confidential data values for one or more cells along with corresponding confidence scores.

20. The non-transitory machine-readable storage medium of claim 18, wherein the computing a set of candidate low rank approximations includes, for each candidate data transformation:

applying the candidate data transformation to the matrix;

obtaining a training matrix by hiding a preset fraction of entries of the transformed matrix; and for each of one or more candidate parameter values for one of the one or more parameters:
  computing the objective function using the candidate parameter value; and
  calculating the error function using the candidate parameter value.

\* \* \* \* \*